US007079007B2

(12) United States Patent

Siegel et al.

(10) Patent No.: US 7,079,007 B2

(45) Date of Patent: Jul. 18, 2006

(54) SYSTEMS AND METHODS UTILIZING BIOMETRIC DATA

(75) Inventors: William G. Siegel, Wellington, FL (US); Greg L. Cannon, Boynton Beach, FL (US); Frank E. Fernandez, Boynton Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 356 days.

(21) Appl. No.: 10/125,650

(22) Filed: Apr. 19, 2002

(65) Prior Publication Data

US 2003/0197593 A1 Oct. 23, 2003

(51) Int. Cl.
*H04Q 1/00* (2006.01)

(52) U.S. Cl. ...................... 340/5.52; 340/5.53; 340/5.8; 340/5.82; 340/5.83; 340/5.85; 382/115; 382/124; 382/125; 713/185; 713/186; 713/200; 235/379

(58) Field of Classification Search ................ 340/5.52, 340/5.53, 5.8, 5.82, 5.83, 5.85, 531; 382/115, 382/124, 125; 713/185, 186, 200; 235/379
See application file for complete search history.

(56) References Cited

U.S. PATENT DOCUMENTS

| | | | |
|---|---|---|---|
| 2,500,017 | A | 3/1950 | Altman |
| 3,200,701 | A | 8/1965 | White |
| 3,475,588 | A | 10/1969 | McMaster |
| 3,482,498 | A | 12/1969 | Becker |
| 3,495,259 | A | 2/1970 | Rocholl et al. |
| 3,527,535 | A | 9/1970 | Monroe |
| 3,540,025 | A | 11/1970 | Levin et al. |
| 3,617,120 | A | 11/1971 | Roka |

(Continued)

FOREIGN PATENT DOCUMENTS

| | | | |
|---|---|---|---|
| EP | 0 101 772 | A1 | 3/1984 |
| EP | 0 308 162 | A3 | 3/1989 |
| EP | 0 308 162 | A2 | 3/1989 |
| EP | 0 379 333 | A1 | 7/1990 |

(Continued)

OTHER PUBLICATIONS

*Sony Fingerprint Identification Terminal,* available at <http: www.iosoftware.com/biosols/sony/fiu/applications/fit100.htm>, 2 pages (visited Nov. 17, 1999).

*Veriprint 2100 Stand–Alone Fingerprint Verification Terminal,* available at <http://www.biometricid.com/veriprint2100.htm>, 3 pages (visited Apr. 27, 1999).

*Ver–i–Fus Fingerprint Access Control Systems,* available at <http://www.intelgate.com/verifus.htm>, 2 pages (visited May 20, 1999).

(Continued)

*Primary Examiner*—Ario Etienne
*Assistant Examiner*—Yves Dalencourt
(74) *Attorney, Agent, or Firm*—Sterne, Kessler, Goldstein & Fox P.L.L.C

(57) ABSTRACT

Systems and methods perform access control and mobile identity verification utilizing a memory, maybe on a handheld device, that stores at least biometric data, such as minutia. The handheld device may also store other data, such as a threshold value and Wiegand data. The data may be stored in a memory, a magnetic strip, a code, a bar code, or in all of these devices associated with the handheld device. The handheld device may be a SmartCard or the like. The threshold value may be a required value or parameter generated from input criteria based on biometric data read and extracted by an extracting system during an enrolling process. The threshold value is used during extracting, matching, or both, to most accurately determine the identity and characteristics of an individual wanting access to an accessed system or being questioned by law enforcement in the field.

21 Claims, 18 Drawing Sheets

U.S. PATENT DOCUMENTS

| | | | | |
|---|---|---|---|---|
| 3,699,519 | A | | 10/1972 | Campbell |
| 3,906,520 | A | | 9/1975 | Phillips |
| 3,947,128 | A | | 3/1976 | Weinberger et al. |
| 3,968,476 | A | | 7/1976 | McMahon |
| 3,975,711 | A | | 8/1976 | McMahon |
| 4,032,975 | A | | 6/1977 | Malueg et al. |
| 4,063,226 | A | | 12/1977 | Kozma et al. |
| 4,120,585 | A | | 10/1978 | DePalma et al. |
| 4,152,056 | A | | 5/1979 | Fowler |
| 4,209,481 | A | | 6/1980 | Kashiro et al. |
| 4,210,899 | A | | 7/1980 | Swonger et al. |
| 4,253,086 | A | | 2/1981 | Szwarcbier |
| 4,322,163 | A | | 3/1982 | Schiller |
| 4,414,684 | A | | 11/1983 | Blonder |
| 4,537,484 | A | | 8/1985 | Fowler et al. |
| 4,544,267 | A | | 10/1985 | Schiller |
| 4,553,837 | A | | 11/1985 | Marcus |
| 4,601,195 | A | | 7/1986 | Garritano |
| 4,669,487 | A | | 6/1987 | Frieling |
| 4,681,435 | A | | 7/1987 | Kubota et al. |
| 4,684,802 | A | | 8/1987 | Hakenewerth et al. |
| 4,701,772 | A | | 10/1987 | Anderson et al. |
| 4,783,823 | A | | 11/1988 | Tasaki et al. |
| 4,784,484 | A | | 11/1988 | Jensen |
| 4,792,226 | A | | 12/1988 | Fishbine et al. |
| 4,811,414 | A | | 3/1989 | Fishbine et al. |
| 4,876,726 | A | | 10/1989 | Capello et al. |
| 4,896,363 | A | * | 1/1990 | Taylor et al. ............... 382/125 |
| 4,905,293 | A | | 2/1990 | Asai et al. |
| 4,924,085 | A | | 5/1990 | Kato et al. |
| 4,933,976 | A | | 6/1990 | Fishbine et al. |
| 4,942,482 | A | | 7/1990 | Kakinuma et al. |
| 4,946,276 | A | | 8/1990 | Chilcott |
| 4,995,086 | A | | 2/1991 | Lilley et al. |
| 5,054,090 | A | | 10/1991 | Knight et al. |
| 5,067,162 | A | | 11/1991 | Driscoll, Jr. et al. |
| 5,067,749 | A | | 11/1991 | Land |
| 5,131,038 | A | | 7/1992 | Puhl et al. |
| 5,146,102 | A | | 9/1992 | Higuchi et al. |
| 5,157,497 | A | | 10/1992 | Topper et al. |
| 5,185,673 | A | | 2/1993 | Sobol |
| 5,187,747 | A | | 2/1993 | Capello et al. |
| 5,210,588 | A | | 5/1993 | Lee |
| 5,222,152 | A | | 6/1993 | Fishbine et al. |
| 5,222,153 | A | | 6/1993 | Beiswenger |
| 5,230,025 | A | | 7/1993 | Fishbine et al. |
| 5,233,404 | A | | 8/1993 | Lougheed et al. |
| 5,249,370 | A | | 10/1993 | Stanger et al. |
| 5,253,085 | A | | 10/1993 | Maruo et al. |
| 5,261,266 | A | | 11/1993 | Lorenz et al. |
| 5,285,293 | A | | 2/1994 | Webb et al. |
| 5,291,318 | A | | 3/1994 | Genovese |
| D348,445 | S | | 7/1994 | Fishbine et al. |
| 5,351,127 | A | | 9/1994 | King et al. |
| D351,144 | S | | 10/1994 | Fishbine et al. |
| 5,363,318 | A | | 11/1994 | McCauley |
| 5,384,621 | A | | 1/1995 | Hatch et al. |
| 5,412,463 | A | | 5/1995 | Sibbald et al. |
| 5,416,573 | A | | 5/1995 | Sartor, Jr. |
| 5,448,649 | A | | 9/1995 | Chen et al. |
| 5,467,403 | A | | 11/1995 | Fishbine et al. |
| 5,469,506 | A | | 11/1995 | Berson et al. |
| 5,471,240 | A | | 11/1995 | Prager et al. |
| 5,473,144 | A | | 12/1995 | Mathurin, Jr. |
| 5,483,601 | A | | 1/1996 | Faulkner |
| 5,509,083 | A | | 4/1996 | Abtahi et al. |
| 5,517,528 | A | | 5/1996 | Johnson |
| 5,528,355 | A | | 6/1996 | Maase et al. |
| 5,548,394 | A | | 8/1996 | Giles et al. |
| 5,591,949 | A | | 1/1997 | Bernstein |
| 5,596,454 | A | | 1/1997 | Hebert |
| 5,598,474 | A | | 1/1997 | Johnson |
| 5,613,014 | A | | 3/1997 | Eshera et al. |
| 5,615,277 | A | | 3/1997 | Hoffman |
| 5,625,448 | A | | 4/1997 | Ranalli et al. |
| 5,640,422 | A | | 6/1997 | Johnson |
| 5,649,128 | A | | 7/1997 | Hartley |
| 5,650,842 | A | | 7/1997 | Maase et al. |
| 5,661,451 | A | | 8/1997 | Pollag |
| 5,680,205 | A | | 10/1997 | Borza |
| 5,689,529 | A | | 11/1997 | Johnson |
| 5,717,777 | A | | 2/1998 | Wong et al. |
| 5,729,334 | A | | 3/1998 | Van Ruyven |
| 5,736,734 | A | | 4/1998 | Marcus et al. |
| 5,745,046 | A | * | 4/1998 | Itsumi et al. ............. 340/5.83 |
| 5,745,684 | A | | 4/1998 | Oskouy et al. |
| 5,748,766 | A | | 5/1998 | Maase et al. |
| 5,748,768 | A | | 5/1998 | Sivers et al. |
| 5,755,748 | A | | 5/1998 | Borza |
| 5,757,278 | A | | 5/1998 | Itsumi |
| 5,767,989 | A | | 6/1998 | Sakaguchi |
| 5,778,089 | A | | 7/1998 | Borza |
| 5,781,647 | A | | 7/1998 | Fishbine et al. |
| 5,793,218 | A | | 8/1998 | Oster et al. |
| 5,801,681 | A | | 9/1998 | Sayag |
| 5,805,777 | A | | 9/1998 | Kuchta |
| 5,809,172 | A | | 9/1998 | Melen |
| 5,812,067 | A | | 9/1998 | Bergholz et al. |
| 5,815,252 | A | | 9/1998 | Price-Francis |
| 5,818,956 | A | | 10/1998 | Tuli |
| 5,822,445 | A | | 10/1998 | Wong |
| 5,825,005 | A | | 10/1998 | Behnke |
| 5,825,474 | A | | 10/1998 | Maase |
| 5,828,773 | A | | 10/1998 | Setlak et al. |
| 5,832,244 | A | | 11/1998 | Jolley et al. |
| 5,832,464 | A | | 11/1998 | Houvener et al. |
| 5,848,231 | A | | 12/1998 | Teitelbaum et al. |
| 5,855,433 | A | | 1/1999 | Velho et al. |
| 5,859,420 | A | | 1/1999 | Borza |
| 5,859,710 | A | | 1/1999 | Hannah |
| 5,862,247 | A | | 1/1999 | Fisun et al. |
| 5,867,802 | A | | 2/1999 | Borza |
| 5,869,822 | A | | 2/1999 | Meadows, II et al. |
| 5,872,834 | A | | 2/1999 | Teitelbaum |
| 5,892,599 | A | | 4/1999 | Bahuguna |
| 5,900,993 | A | | 5/1999 | Betensky |
| 5,907,627 | A | | 5/1999 | Borza |
| 5,920,384 | A | | 7/1999 | Borza |
| 5,920,640 | A | | 7/1999 | Salatino et al. |
| 5,920,642 | A | | 7/1999 | Merjanian |
| 5,928,347 | A | | 7/1999 | Jones |
| 5,942,761 | A | | 8/1999 | Tuli |
| 5,946,135 | A | | 8/1999 | Auerswald et al. |
| 5,960,100 | A | | 9/1999 | Hargrove |
| 5,973,731 | A | | 10/1999 | Schwab |
| 5,974,162 | A | | 10/1999 | Metz et al. |
| 5,987,155 | A | | 11/1999 | Dunn et al. |
| 5,991,467 | A | | 11/1999 | Kamiko |
| 5,995,014 | A | | 11/1999 | DiMaria |
| 5,999,307 | A | | 12/1999 | Whitehead et al. |
| 6,016,476 | A | | 1/2000 | Maes et al. |
| 6,018,739 | A | | 1/2000 | McCoy et al. |
| 6,023,522 | A | | 2/2000 | Draganoff et al. |
| 6,038,332 | A | | 3/2000 | Fishbine et al. |
| 6,041,372 | A | | 3/2000 | Hart et al. |
| 6,055,071 | A | | 4/2000 | Kuwata et al. |
| 6,064,398 | A | | 5/2000 | Ellenby et al. |
| 6,064,753 | A | | 5/2000 | Bolle et al. |
| 6,064,779 | A | | 5/2000 | Neukermans et al. |
| 6,072,891 | A | | 6/2000 | Hamid et al. |
| 6,075,876 | A | | 6/2000 | Draganoff |

| | | | | | |
|---|---|---|---|---|---|
| 6,078,265 | A | | 6/2000 | Bonder et al. | |
| 6,088,585 | A | | 7/2000 | Schmitt et al. | |
| 6,097,873 | A | | 8/2000 | Filas et al. | |
| 6,104,809 | A | | 8/2000 | Berson et al. | |
| 6,115,484 | A | | 9/2000 | Bowker et al. | |
| 6,122,394 | A | | 9/2000 | Neukermans et al. | |
| 6,140,939 | A | | 10/2000 | Flick | |
| 6,144,408 | A | | 11/2000 | MacLean | |
| 6,150,665 | A | | 11/2000 | Suga | |
| 6,154,285 | A | | 11/2000 | Teng et al. | |
| 6,162,486 | A | | 12/2000 | Samouilhan et al. | |
| 6,166,787 | A | | 12/2000 | Akins et al. | |
| 6,178,255 | B1 | | 1/2001 | Scott et al. | |
| 6,182,221 | B1 | * | 1/2001 | Hsu et al. | 713/186 |
| 6,195,447 | B1 | | 2/2001 | Ross | |
| 6,198,836 | B1 | | 3/2001 | Hauke | |
| 6,204,331 | B1 | | 3/2001 | Sullivan et al. | |
| 6,259,108 | B1 | | 7/2001 | Antonelli et al. | |
| 6,272,562 | B1 | | 8/2001 | Scott et al. | |
| 6,281,931 | B1 | | 8/2001 | Tsao et al. | |
| 6,311,272 | B1 | * | 10/2001 | Gressel | 713/186 |
| 6,327,047 | B1 | | 12/2001 | Motamed | |
| 6,347,163 | B1 | | 2/2002 | Roustaei | |
| 6,394,356 | B1 | | 5/2002 | Zagami | |
| 6,424,249 | B1 | * | 7/2002 | Houvener | 340/5.82 |
| 6,687,829 | B1 | * | 2/2004 | Miyamoto et al. | 713/200 |
| 6,758,394 | B1 | * | 7/2004 | Maskatiya et al. | 235/379 |
| 6,819,219 | B1 | * | 11/2004 | Bolle et al. | 340/5.52 |
| 2002/0030668 | A1 | | 3/2002 | Hoshino et al. | |
| 2003/0025599 | A1 | * | 2/2003 | Monroe | 340/531 |

FOREIGN PATENT DOCUMENTS

| | | | |
|---|---|---|---|
| EP | 0 623 890 | A2 | 11/1994 |
| EP | 0 623 890 | A3 | 11/1994 |
| EP | 0 653 882 | A1 | 5/1995 |
| EP | 0 379 333 | B1 | 7/1995 |
| EP | 0 889 432 | A3 | 1/1999 |
| EP | 0 889 432 | A2 | 1/1999 |
| EP | 0 905 646 | A1 | 3/1999 |
| EP | 0 785 750 | B1 | 6/1999 |
| EP | 0 924 656 | A2 | 6/1999 |
| GB | 2 089 545 | A | 6/1982 |
| GB | 2 313 441 | A | 11/1997 |
| JP | 62-212892 | A | 9/1987 |
| JP | 1-205392 | A | 8/1989 |
| JP | 3-161884 | A | 7/1991 |
| JP | 3-194674 | A | 8/1991 |
| JP | 3-194675 | A | 8/1991 |
| JP | 11-225272 | A | 8/1999 |
| JP | 11-289421 | A | 10/1999 |
| WO | WO 87/02491 | A1 | 4/1987 |
| WO | WO 90/03620 | A1 | 4/1990 |
| WO | WO 92/11608 | A1 | 7/1992 |
| WO | WO 94/22371 | A3 | 10/1994 |
| WO | WO 94/22371 | A2 | 10/1994 |
| WO | WO 96/17480 | A2 | 6/1996 |
| WO | WO 96/17480 | A3 | 6/1996 |
| WO | WO 97/29477 | A1 | 8/1997 |
| WO | WO 97/41528 | A1 | 11/1997 |
| WO | WO 98/09246 | A1 | 3/1998 |
| WO | WO 98/12670 | A1 | 3/1998 |
| WO | WO 99/12123 | A1 | 3/1999 |
| WO | WO 99/26187 | A1 | 5/1999 |
| WO | WO 99/40535 | A1 | 8/1999 |

OTHER PUBLICATIONS

*Fujitsu Fingerprint Recognition Device* (*FPI–550*), available at <http://www.iosoftware.com/biosols/fujitsu/fpi550.htm>, 2 pages (visited Nov. 17, 1999).

*Mytec's Revolutionary Physical Access Control System,* available at <http://www.mytec.com/Products/Gateway/>, 1 page (visited Apr. 27, 1999).

*Access Control System Configurations,* available at <http://www.intelgate.com/access.htm>, 2 pages (visited May 20, 1999).

*Series 700 ID Station,* available at <http://www.ultra–scan.com/700.htm>, 3 pages (visited Nov. 17, 1999).

*Biometric terminal,* 1 page.

Copy of International Search Report for Appln. No. PCT/US03/12278, mailed Aug. 11, 2003, 5 pages.

Btt (Biometric Technology Today), Finger technologies contacts, 2 pages.

Drake, M.D. et al., "Waveguide hologram fingerprint entry device," *Optical Engineering,* vol. 35, No. 9, Sep. 1996, pp. 2499–2505.

Roethenbaugh, G. (ed.), *Biometrics Explained,* 1998, ICSA, pp. 1–34.

*Automated Identification Systems* (visited May 20, 1999) <http://www.trw.com/idsystems/bldgaccess2.html>, 1 page, Copyright 1999.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://dermalog.de/Britain/Products/ID–Card/Idcard2.htm>, 2 pages.

*Fujitsu Limited Products and Services* (updated Apr. 21, 1999) <http://www.fujitsu.co.jp/hypertext/Products/Index–e.html>, 3 pages, Copyright 1995–1999.

*SonyDCam* (visited May 20, 1999) <http://www.microsoft-.com/DDK/ddkdocs/Win2k/sonydcam.htm>, 3 pages, Copyright 1999.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*Sac Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

*Mytec Technologies Gateway: Features & Benefits,* (visited Apr. 27, 1999) <http://www.mytec.com/Products/gateway/features.htm>, 1 page.

*Mytec Technologies Touchstone Pro,* (visited Apr. 27, 1999) <http://www.mytec.com/Products/Touchstone/>, 1 page.

*Mytec Technologies Touchstone Pro: Features,* (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclock.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate.com/index.html>, 1 page, Copyright 1996.

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{m®}$* (visited May 20, 1999) <http://www.intelgate.com/vif_data.htm>, 3 pages. (Ver–i–fus product released in 1995).

*Company* (visited May 17, 1999) <http://www.instainfo.com.company.htm>, 2 pages.

*TouchLock™ II Fingerprint Identity Verification Terminal* (visited May 17, 1999) <http://www.identix.com/TLock.htm>, 4 pages.

*Physical Security and Staff Tracking Solutions* (visited May 17, 1999) <http://www.identix.com/products/biosecurity.html>, 3 pages, Copyright 1996–1998.

*Veriprint2000 Fingerprint Verification Terminal For Use With Jantek Time & Attendance Software* (visited May 17, 1999) <http://www.hunterequipment.com/fingerprint.htm>, 2 pages.

*Veriprint Product Applications* (visited Apr. 27, 1999) <http://www.biometricid.com/uses.htm>, 1 page.

*BII Home Page* (visited Apr. 27, 1999) <http://www.biometricid.com/homepage.htm>, 1 page, Copyright 1999.

Randall, N., "A Serial Bus on Speed," *PC Magazine,* May 25, 1999, pp. 201–203.

*The DERMALOG Check–ID* (visited Nov. 12, 1999) <http://www.dermalog.de/ganzneu/products__check.html>, 1 page.

*Check–ID Specifications and Features* (visited Nov. 12, 1999) <http://www.dermalog.de/ganzneu/spec__check.html>, 1 page, Copyright 1999.

*Startek's Fingerprint Verification Products: FingerFile 1050* (visited Oct. 8, 1999) <http://www.startec.com.tw/product/ff1050/ff1050.html>, 3 pages.

*Time Is Money*! (visited Jun. 5, 1998) <http://www.laus.com/afim.htm>, 3 pages.

*LS 1 LiveScan Booking Workstation High Performance Finger & Palm Scanning System* (visited Jun. 4, 1998) <http://www.hbs–jena.com/is1.htm>, 6 pages, Copyright 1998.

*Welcome to the Homepage of Heimann Biometric Systems GMBH* (visited Jun. 4, 1998) <http://www.hbs–jena.com/>, 1 page, Copyright 1998.

*Heimann Biometric Systems Corporate Overview* (visited Jun. 4, 1998) <http://www.hbs–jena.com/company.htm>, 4 pages, Copyright 1998.

*Remote Access Positive IDentification—raPID* (visited Jun. 3, 1998) <http://www.nec.com/cgi–bin/showproduct.exe?pro...emote+Access+Positive+IDentification+%2D+raPID>, 2 pages, Copyright 1997.

*Morpho DigiScan Cellular* (visited Jun. 3, 1998) <http://www.morpho.com/products/law__enforcement/digiscan/cellular.htm>, 2 pages, Copyright 1998.

*A.F.I.S.* (last updated Apr. 2, 1998) <http://www.dermalog.de/afis.htm>, 2 pages.

*Morpho FlexScan Workstation* (visited Jun. 3, 1998) <http://www.morpho.com/products/law__enforcement/flexscan/>, 2 pages, Copyright 1998.

True–ID® The LiveScan with special "ability". . . , 2 pages.

*Printrak International: User List* (visited Jun. 3, 1998) <http://www.printrakinternational.com and links>, 10 pages, Copyright 1996.

*Live–Scan Products: Tenprinter® 1133S* (visited Apr. 23, 1999) <http://www.digitalbiometrics.com/Products/tenprinter.htm>, 4 pages. (Tenprinter 1133S released in 1996).

*TouchPrint™ 600 Live–Scan System* (visited Nov. 17, 1999) <http://www.identix.com/products/livescan.htm>, 4 pages, Copyright 1996–1998.

Systems for Live–Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999.

Verid Fingerprint Reader, TSSI, 4 pages.

Response to Request for Information, Cross Match Technologies, Inc., 13 pages, Apr. 14, 1999.

*Startek's Fingerprint Verification Products* (visited Nov. 17, 1999) <http://www.startek.comtw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sagem.com/en/produit4–en/empreinte–dig–en.htm>, 1 page.

*Digital Biometrics Corporate Information* (visited Nov. 17, 1999) <http://www.digitalbiometrics.com/Corporate__info/Corporate__info.htm>, 2 pages. (discusses technology as early as 1985).

*DBI Live–Scan Products: Digital Biometrics TENPRINTER* (visited Nov. 17, 1999) <http://www.digitalbiometrics.com/products/tenprinter.htm>, 4 pages. (Tenprinter released in 1996).

*DBI Live–Scan Products: Networking Options* (visited Nov. 17, 1999) <http://www.ditalbiometrics.com/products/networking__options.htm>, 3 pages.

*DBI Live–Scan Products: Digital Biometrics FingerPrinter CMS* (visited Nov. 17, 1999) <http://www.digitalbiometrics.com/products/FingerPrinterCMS.htm>, 3 pages. (CMS released in 1998).

*DBI Live–Scan Products: Image Printer Stations* (visited Nov. 17, 1999) <http://www.digitalbiometrics.com/products/imageprinter.htm>, 2 pages.

*DBI Live–Scan Products: FC–21 Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra–scan.com/400.htm>, 3 pages. (Scanner released in 1996).

*USC Scanner Design* (visited Nov. 17, 1999) <http://www.ultra–scan.com/scanner.htm>, 4 pages. (Scanner released in 1996).

*Series 500/600 Scanners* (visited Nov. 17, 1999) <http://www.ultra–scan.com/500.htm>, 3 pages. (Scanner released in 1996).

*Identix: The Corporation* (visited Nov. 17, 1999) <http://www.identix.com/corporate/home.htm>, 2 pages, Copyright 1996–1998.

*Biometric Imaging Products* (visited Nov. 17, 1999) <http://www.identix.com/products/bioimage.htm>, 1 page, Copyright 1996–1998.

*TouchPrint™ 600 Palm Scanner* (visited Nov. 17, 1999) <http://www.identix.com/products/palmscan.htm>, 3 pages, Copyright 1996–1998.

*TouchPrint™ 600 Card Scan System* (visited Nov. 17, 1999) <http://www.identix.com/products/cardscan.htm>, 3 pages, Copyright 1996–1998.
*Dermalog Key—The safest and easiest way of access control* (Last updated Jul. 18, 1998) <http://www.dermalog.de/Britain/Products/Key/key.htm>, 1 page.
*Dermalog Finger–ID Your small size solution for high security* (Last updated Jul. 18, 1998) <http://www.dermalog.de/Britain/Products/Finger/fingerid.htm>, 1 page.
*Mytec: Corporate* (visited Nov. 17, 1999) <http://www-.mytec.com/corporate/>, 2 pages.
*Kinetic Sciences Inc. Fingerprint Biometrics Division* (visited Nov. 17, 1999) <http://www.kinetic.bc.ca/main–FP-B.html>, 1 page.
*Fingerprint Biometrics: Securing The Next Generation,* May 19, 1999, (visited Nov. 17, 1999) <http://www.secugen.com/pressrel.htm>, 2 pages.
*Secugen Unveils Fully Functional Fingerprint Recognition Solutions,* May 11, 1999, (visited Nov. 17, 1999) <http://www.secugen.com/pressrel.htm>, 3 pages.
*POLLEX Technology Ltd., The Expert in Fingerprint Identification—POLLog* (visited Nov. 17, 1999) <http://www.pollex.ch/english/products/pollog.htm>, 2 pages.
*Sony Fingerprint Identification Unit* (*FIU–700*) (visited Nov. 17, 1999) <http://www.iosoftware.com/biosols/sony/flu70/index.htm>, 2 pages. (Unit available late 1999).
*Sony Fingerprint Identification Unit* (visited Nov. 17, 1999) <http://www.isoftware.com/biosols/sony/flu/index.htm>, 3 pages.
*Mitsubishi MyPass LP–1002* (visited Nov. 17, 1999) <http://www.iosoftware.com/biosols/mitsubishi/mypass.htm>, 2 pages.
*SecureTouch PV—A Personal Password Vault* (visited Nov. 17, 1999) <http://www.biometricaccess.com/securetouch__pv.htm>, 1 page.
*Digital Descriptor Systems, Inc.–Profile* (visited Nov. 17, 1999) <http://www.ddsl–cpc.com/pages/profile.html>, 3 pages.
*Press Release: Printrak International Announces New Portable Fingerprint ID Solution,* Dec. 10, 1996, (visited Nov. 17, 1999) <http://www.scott.net/~dg/25.htm>, 3 pages.
*Corporate Profile* (visited Nov. 17, 1999) <http://www.printrakinternational.com/corporate.htm>, 1 page.
*Printrak Products* (visited Nov. 17, 1999) <http://www-.printrakinternational.com/Products.htm>, 1 page. (Discusses technology as early as 1974).
Verifier™ 200 Fingerprint Capture Devices, Cross Match Technologies, Inc., 2 pages, 1996–1997.
Verifier 200 Direct Fingerprint Reader, Cross Check Corporation, 2 pages, 1996–1997.
Verifier™ 250 Fingerprint Capture Devices, Cross Match Technologies, Inc., 2 pages, 1996–1997.
Verifier 250 Small Footprint Direct Fingerprint Reader, Cross Check Corporation, 2 pages, 1996–1997.
Verifier™ 290 Fingerprint Capture Devices, Cross Match Technologies, Inc., 2 pages, 1996–1997.
Verifier 290 Direct Rolled Fingerprint Reader, Cross Check Corporation, 2 pages, 1996–1997.
Verifier™ 500 Fingerprint Capture Devices, Cross Match Technologies, Inc., 2 pages, 1998.
10–Print Imaging System, Cross Check Corporation, 2 pages, 1998.
*Cross Match Technologies, Inc.* (visited Mar. 25, 1999) <http://www.crossmatch.net/, 1 page.
*Cross Match Technologies, Inc.—Products Overview* (visited Mar. 25, 1999) <http://www.crossmatch.net/new/products/product–index.html>, 1 page.
*Cross Match Technologies, Inc.—Law Enforcement Systems* (visited Mar. 25, 1999) <http://www.crossmatch.net/new/law/law–Index.html>, 2 pages.
*Cross Match Technologies, Inc.—Commercial Systems: Building On The Standard* (visited Mar. 25, 1999) <http://www.crossmatch.net/new/commercial/commercial–Index.html>, 2 pages.
*Cross Match Technologies, Inc.—International Sales* (visited Mar. 25, 1999) <http://www.crossmatch.net/new/sales/sales–Index.html>, 1 page.
*Cross Match Technologies, Inc.—Support* (visited Mar. 25, 1999) <http://www.crossmatch.net/new/support/support–index.html>, 1 page.
*Cross Match Technologies, Inc.—News—Press Releases—Verifier 400 Press Release* (visited Mar. 25, 1999) <http://www.crossmatch.net/new/news/news–pr–050798.html>, 1 page.
*Global Security Fingerscan™ System Overview* (visited Jan. 11, 2000) <http://wwwu–net.com/mbp/sol/g/a9.htm>, 12 pages.
"Command Structure for a Low–Cost (Primitive) Film Scanner," *IBM Technical Disclosure Bulletin,* IBM Corp., vol. 35, No. 7, Dec. 1992, pp. 113–121.
*Fingerprint Scan API Toolkit Version 1.x Feature List* (Apr. 26, 2000) <http://www.mentalix.com/api/archive__fapiv-1.htm>, 3 pages.
"Image Acquisition System," *IBM Technical Disclosure Bulletin,* IBM Corp., vol. 29, No. 5, Oct. 1986, pp. 1928–1931.
Kunzman, Adam J. and Wetzel, Alan T., "1394 High Performance Serial Bus: The Digital Interface for ATV," *IEEE Transaction on Consumer Electronics, IEEE,* vol. 41, No. 3, Aug. 1995, pp. 893–900.
*Mentalix Provides The First IAFIS–Certified Latent Print Scanning Solution For Windows* (Jul. 23, 1999) <http://www.mentalix.com/pressreleases/fprintplook3__prel.htm>, 2 pages.
Sluijs, F. et al., "An On–chip USB–powered Three–Phase Up/down DC/DC Converter in a Standard 3.3V CMOS Process," *2000 IEEE International Solid–State Circuit Conference,* IEEE, Feb. 9, 2000, pp. 440–441.
Venot, A. et al., "Automated Comparison of Scintigraphic Images," *Journal of Nuclear Medicine,* vol. 27, No. 8, Aug. 1986, pp. 1337–1342.
English–language Abstract for Japanese Patent Publication No. 59–103474, published Jun. 14, 1984, printed from espacenet.com, 1 page.
English–language Abstract for Japanese Patent Publication No. 62–212892, published Sep. 18, 1987, printed from espacenet.com, 1 page.
English–language Abstract for Japanese Patent Publication No. 1–205392, published Aug. 17, 1989, printed from espacenet.com, 1 page.
English–language Abstract for Japanese Patent Publication No. 3–161884, published Jul. 11, 1991, printed from espacenet.com, 1 page.
English–language Abstract for Japanese Patent Publication No. 3–194674, published Aug. 26, 1991, printed from espacenet.com, 1 page.

English–language Abstract for Japanese Patent Publication No. 3–194675, published Aug. 26, 1991, printed from espacenet.com, 1 page.
English–language Abstract for Japanese Patent Publication No. 10–079017, published Mar. 24, 1998, printed from espacenet.com, 1 page.
English–language Abstract for Japanese Patent Publication No. 10–262071, published Sep. 29, 1998, printed from espacenet.com, 1 page.
English–language Abstract for Japanese Patent Publication No. 11–167630, published Jun. 22, 1999, printed from espacenet.com, 1 page.
English–language Abstract for Japanese Patent Publication No. 11–225272, published Aug. 17, 1999, printed from espacenet.com, 1 page.
English–language Abstract for Japanese Patent Publication No. 11–252489, published Sep. 17, 1999, printed from espacenet.com, 1 page.
English–language Abstract for Japanese Patent Publication No. 11–289421, published Oct. 19, 1999, printed from espacenet.com, 1 page.

* cited by examiner

FIG. 6
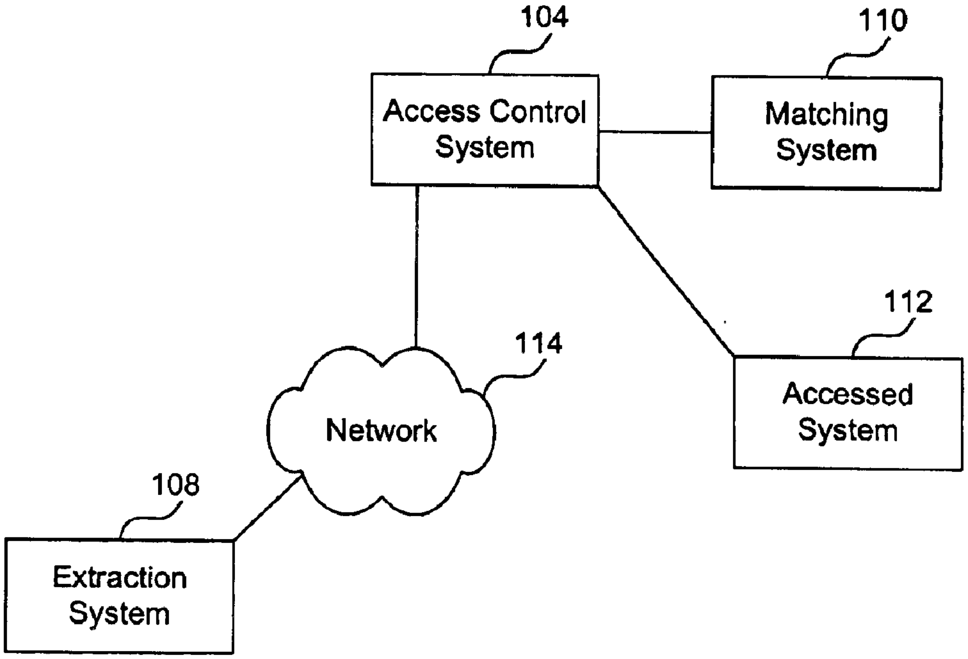
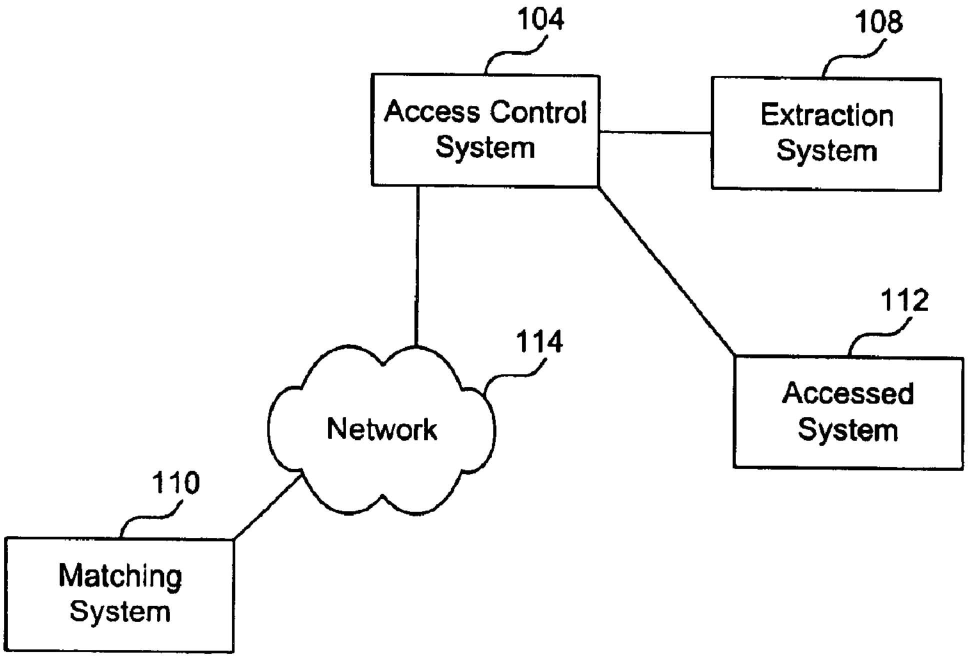
FIG. 7

SYSTEMS AND METHODS UTILIZING BIOMETRIC DATA

BACKGROUND OF THE INVENTION

1. Field of the Invention

The present invention is directed to the field of access control and remote identity verification, in particular, utilizing biometric technology.

2. Related Art

Access control systems are used to limit access to selected individuals.

Some of these systems use biometric technologies to determine whether access for an individual will be granted or denied. A biometric is a unique, measurable characteristic or trait of a human being for automatically recognizing or verifying identity. For instance, fingerprint biometrics are largely regarded as an accurate method of biometric identification and verification. See, e.g., Roethenbaugh, G. Ed., *Biometrics Explained* (International Computer Security Association: Carlisle, Pa. 1998), pages 1–34, which is herein incorporated by reference in its entirety. Access control units (ACUs) may be placed locally to perform a biometric analysis on the individual, and determine whether access will be granted or denied. As the number of people needing access to facilities grows, so must be any database holding their biometric information. Eventually, this will become a prohibitive aspect of access control because of the cost, both in equipment and updating time, required to maintain an ever increasing amount of stored biometric data.

What is needed is a system utilizing a device that stores data for an unlimited number of enrollees allowing easy scalability. Also, a system is needed that utilizes a device that allows for easy updating of stored biometric information to keep all information current for all enrollees.

BRIEF SUMMARY OF THE INVENTION

Embodiments of the present invention provide a system including an enrollment system that controls storing of biometric data. The system further includes an access control system that reads the stored biometric data, an extracting system coupled to the access control system that extracts live biometric data, and a matching system coupled to the access control system that compares the stored biometric data to the live read biometric data to generate a matching result that is transmitted to the access control system. The system further includes an accessed system coupled to the access control system into which admittance is either allowed or denied based on the matching result. The system may also include a threshold controller that determines and generates a threshold value to be used during extracting, matching, or both. Using the threshold value increases the number of enrollees successfully managed by an access control system, and reduces the number of false rejections of entry. Thresholds can also provide more data with which to make an access control decision rather than mere presentation of a biometric input. These thresholds are individualized and help to make a more informed security decision that, among other things, reduces the rejection of more difficult to read fingerprints.

Other embodiments of the present invention provide a method including the step of enrolling enrollees and storing their biometric data. The method further includes the steps of performing a live read of one of the enrollees using a reader in an access control system, extracting live biometric data during the live read in an extracting system, and comparing the extracted live biometric data with the stored biometric data in a matching system and outputting a matching result. The method further includes the step of performing access control based on the matching result. The method also includes the steps of determining and generating a threshold value to be used during extracting, matching, or both.

According to a further feature, processing is distributed across a networked system. In one embodiment, extraction is carried out remotely over a network. In another embodiment, matching is carried out remotely over a network. In this way, an access control reader or panel need not perform extraction and matching, which reduces processing requirements at the access control reader or panel. Processing of extraction and matching is more efficiently managed at the remote sites, for example different extraction or matching algorithms, or changes thereto, can be more easily implemented.

Further, the system is more scalable as additional, cheaper access control readers and panels utilizing biometric data can be easily added.

According to a further feature, in one embodiment the access control system is easily installed as an upgrade to an existing Wiegand panel through the use of a live access control reader, which acts as an interface to a Wiegand panel.

Some advantages of the system and method may be that they provide an access control system and method that utilizes a device allowing for data to be stored for an unlimited number of enrollees allowing easy scalability. Also, a system and method are provided that utilize a device requiring little, if any, updating time to keep current stored biometric information for all enrollees.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 6 shows example elements of the system of FIG. 1 with a networked extracting system.

FIG. 7 shows example elements of the system of FIG. 1 with a networked matching system.

Figure 1:
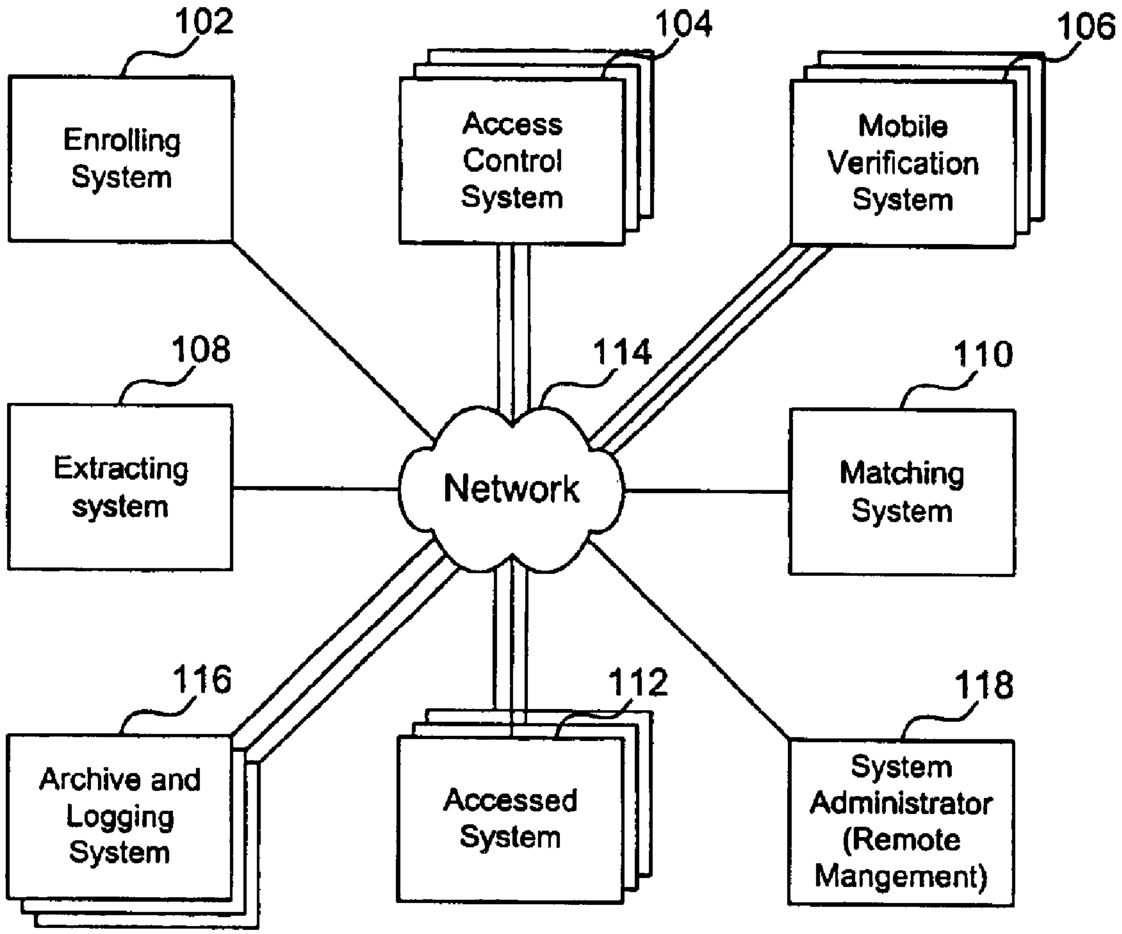
FIG. 1 shows an example biometric-based system according to embodiments of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Overview and Terminology

Some embodiments of the present invention are directed to systems and methods that perform access control and mobile identity verification, including examples utilizing a handheld device, with a memory that stores at least biometric data, such as minutia. The handheld device may also store other data, such as a threshold value and Wiegand data. The data may be stored in a memory, a magnetic strip, a machine-readable code, a bar code, or in all of these devices associated with the handheld device. The handheld device may be a SmartCard or the like.

One example of biometric data that may need the threshold value is a value indicative of a fingerprint image capture quality of an individual. For example, a low value can indicate a relative poor image capture quality, while a high value can indicate a relative high capture quality. Low threshold values may be appropriate for individuals with difficult to read fingerprints, such as those with dry fingers, missing or damaged fingers, or birth defects. High threshold values may be appropriate for individuals with easy to read fingerprints, such as those with oily fingers or with complete fingertips having a number of distinct minutiae. In some embodiments of the invention, threshold values can be numeric values or categorical values (such as good, average, poor). These threshold values can be used in a variety of ways in the systems of the present invention to accommodate an even greater range of biometric objects successfully managed by the system. The threshold value is used during extracting, matching, or both, to most accurately determine the identity and characteristics of an individual wanting access to an accessed system or being questioned by law enforcement in the field.

An object as used throughout the specification may be a physical part of an individual, such as an eye, a finger, a limb, etc. An accessed system as used through the specification may be any known system that requires some limitation to entry, which can be a computer, electrical or mechanical equipment, a room, a hallway, a building, a section of a compound, etc. An enrollee as used throughout the specification may be any individual, whether within a business setting, public setting, or otherwise. As mere examples, an enrollee may be an employee of a company, a person receiving governmental assistance, a prisoner, or a person at a traffic stop. Matching used throughout the specification relates to matching either 1:1 to determine if the individual matches with whom he/she says he/she is or 1:m, where m= all the enrollees, to determine if an individual is an enrollee at all.

Overall Access Control and Remote Verification System

With reference to FIG. 1, a system 100 is shown according to some embodiments of the present invention. The system 100 may perform access control and remote identity verification. The system 100 includes an enrolling system 102, an access controller system 104, a mobile verification system 106, an extracting system 108, a matching system 110, and an accessed system 112. In some embodiments the systems 102–112 may be coupled together via one or more networks 114, while in other embodiments the systems 102–112 may be directly coupled to each other. In other embodiments, the system 100 may also include an archive and logging system 116, which may have multiple archiving and logging devices 116. The archiving system 116 may store bit maps of biometric information at a certain quality for each enrollee and the logging system 116 may keep track of each enrollee or each accessed system 112. As mere examples, logging may be used for an audit trail of an enrollee's movements or how many time access is allowed or denied for an accessed system 112. In still further embodiments, the system 100 may also include a system administrator 118 for remote management of the system 100.

Enrolling System

Figure 2:
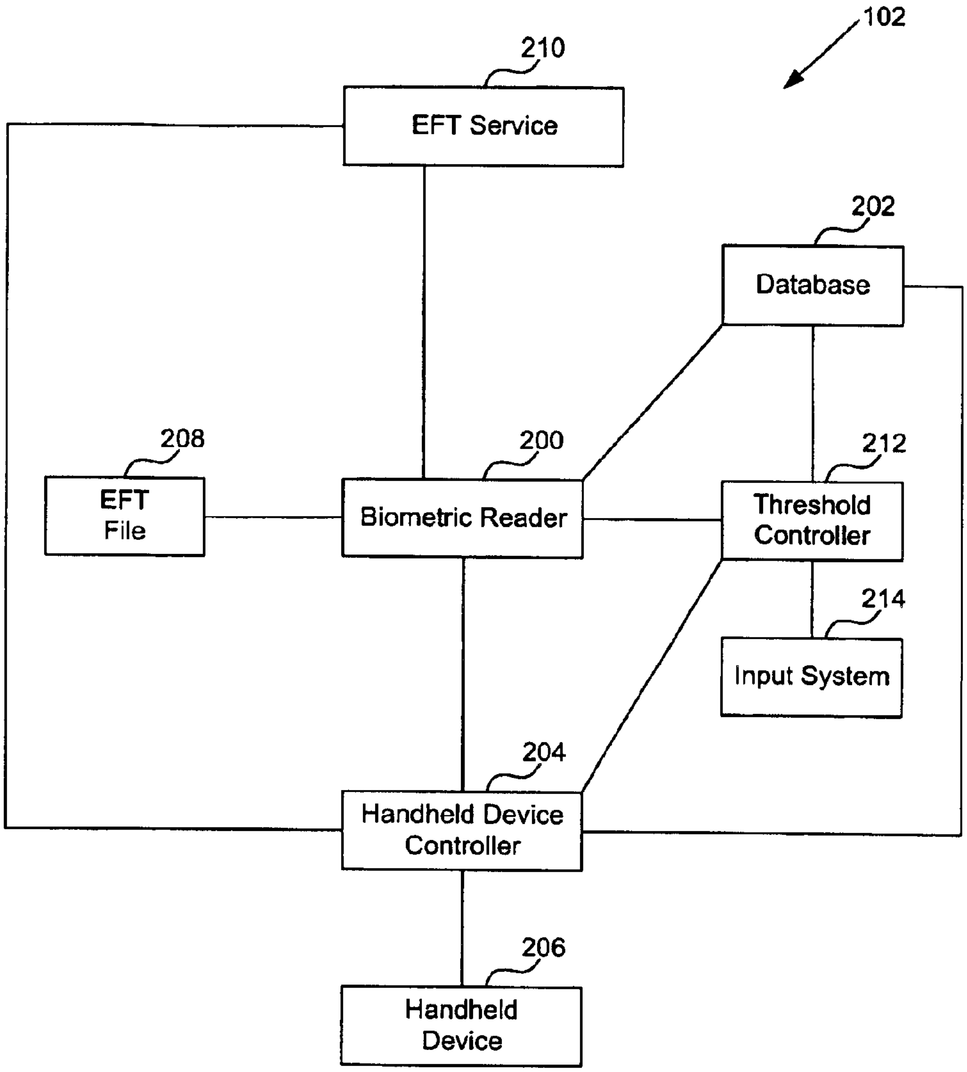
FIG. 2 shows example elements of an enrolling system in FIG. 1.

Now turning to FIG. 2, details of the enrolling system 102 according to embodiments of the present invention are shown. The enrolling system includes a biometric reader 200 coupled to a database 202, where the read biometric information is stored in a memory of the database 202. In other embodiments, either in addition to or in place of the database 202, the biometric reader can be coupled to a handheld device controller 204 that is coupled to a handheld device 206. In these embodiments, the read biometric data is stored in a memory in or on the handheld device 206. In some embodiments, the handheld device 206 may be a SmartCard or the like.

Through use of this handheld device 206 the need for a large database is virtually eliminated because biometric and other personal data can be stored on the handheld device 206. There would also be no need to update a central database, just the hand held device 206 memory, which ensures more accurate information is timely maintained. The use of the handheld device 206 is most effective for systems that have a large and continuously growing enrollee list.

In embodiments where the biometric reader 200 reads and extracts fingerprints, the biometric reader 200 may be coupled between an electronic fingerprint template (EFT) file 208 and an EFT service 210. The EFT file 208 converts read fingerprint data into a predetermined form and transmits the data to the EFT Service 210, which may be the Federal Bureau of Investigations (FBI), other federal, state, or local authorities, private entities, or the like. This data is then used by the EFT Service 210 to run background checks on possible enrollees.

In still other embodiments the enrolling system 102 may include a threshold controller 212 coupled between the biometric reader 200, the handheld device controller 204 and/or the database 202, and an input system 214. According to one feature, threshold values associated with each biometric input are assigned and stored during enrollment in an enrolling system. In this way, the assignment and storage of correct or suitable thresholds can be obtained during enrollment. This may have advantages in many practical situations where more experienced personnel are available at enrollment to monitor threshold value assignment and storage. Also, the presentation of biometric input at enrollment may often occur in a setting where more time is available for ensuring proper threshold values are assigned and quality biometric data, such as fingerprint data, are captured. Details of the threshold controller 212 are described below with reference to FIGS. 9A–9B and FIGS. 17A–17B.

Mobile Verification System

Figure 3:
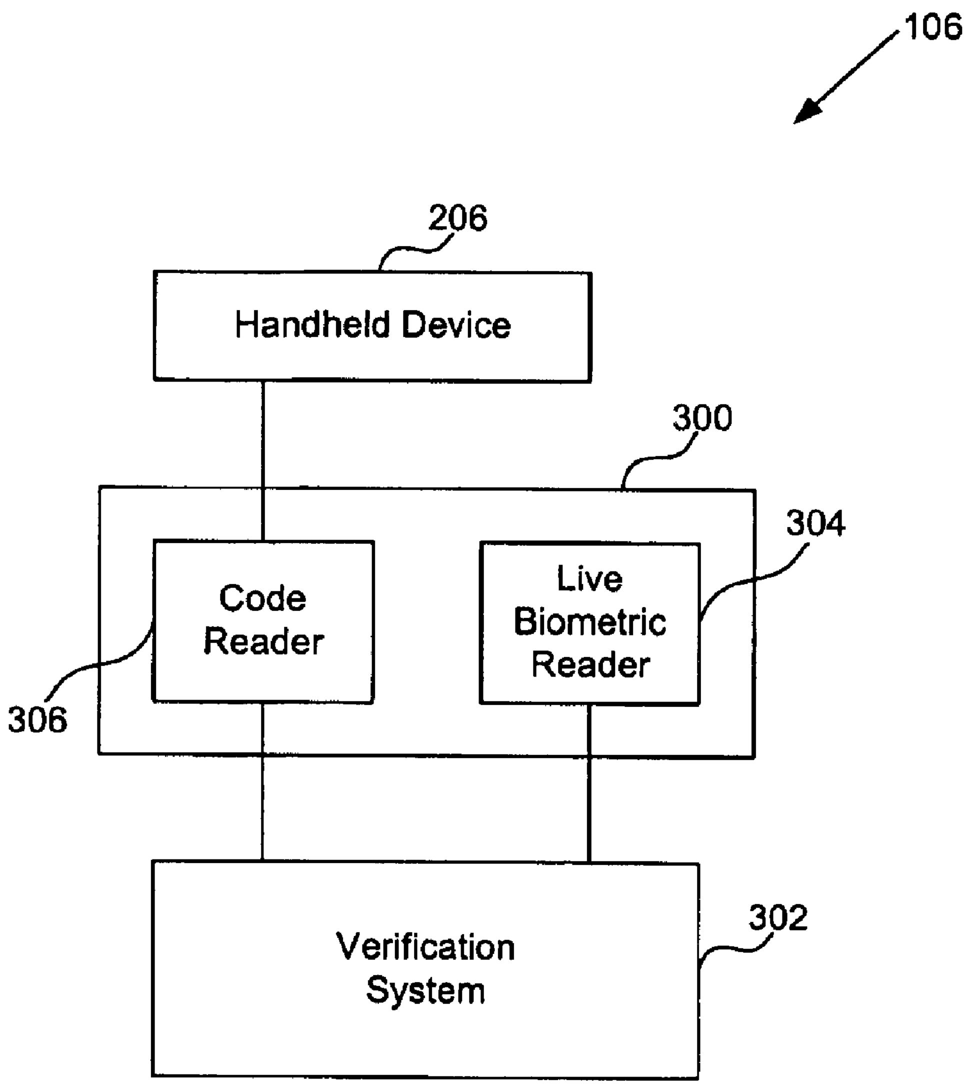
FIG. 3 shows example elements of a remote verification system in FIG. 1.

Now turning to FIG. 3, details of the mobile verification system 106 according to embodiments of the present invention are shown. The mobile verification system 103 includes a reading device 300 coupled to a verification system 302. In some embodiments the reading device 300 only includes a live biometric reader 304. In other embodiments the reading device 300 also includes a code reader 306. This system may be utilized by law enforcement officials in the field to determine the identity of individuals. The handheld device 206 may include a machine-readable code or a one dimensional or two-dimensional bar code (not shown for convenience) as is known in the art. This code may contain biometric data, a threshold value, or other information that can be used in determining the identity of individuals. The handheld device 206 may also include a magnetic stripe, or the like, that can be read by the verification system 302 to gain additional information. An example of other information or data may be an electronic "signature" by a trusted source that authenticates the handheld device 206. Thus, in this environment, the handheld device 206 may be a driver's license, SmartCard, or the like. In one example, the verification system 302 may be a law enforcement field computer (not shown) with a USB port that couples the reader 300 via the network 114 to a central processing system.

According to one embodiment, the reader 300 is a handheld, mobile device. This is helpful in allowing capture of biometric data at different locations. Individuals can be checked during spot checks, mobile or roving checks, and in other ways to provide additional security in support of access control systems. This is especially helpful in applications such as airport security, where spot checks need to be performed on a tarmac or runway, in a terminal, etc. Other applications that require mobile verifications also benefit from the mobile reader 300. Wireless links can also be used to transfer data from the mobile reader 300 to the verification system 302.

Access Control Apparatus

Access Control Reader

Figure 4:
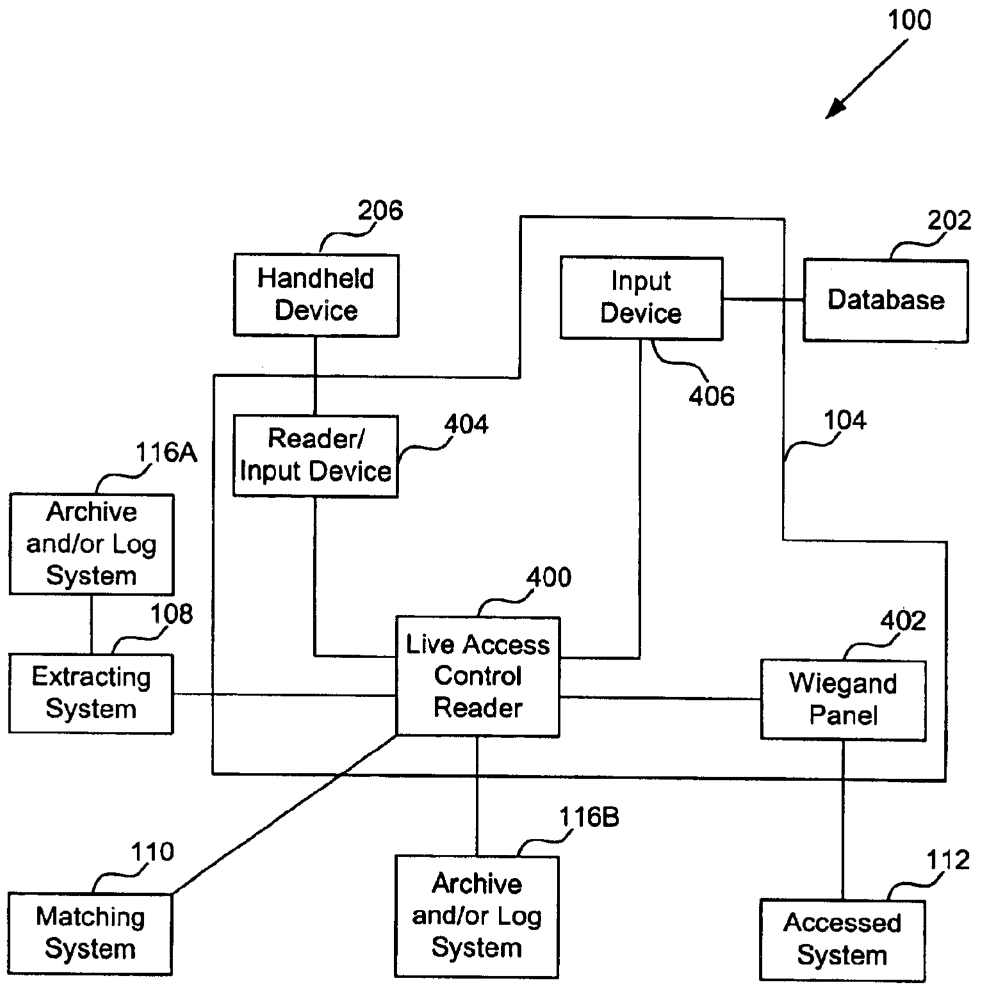
FIG. 4 shows example elements of the system of FIG. 1 with an access control reader in an access control system.

FIG. 4 shows details of the access control system 104 in the system 100 according to embodiments of the present invention. The access control system 104 includes a live access control reader 400 and a Wiegand panel 402. In some embodiments the live access control reader 400 is coupled to a reader/input device 404 that reads the handheld device 206. In other embodiments the access control reader 400 is coupled to an input device 406, which may be a key system that accesses information in the database 202 based on correlating entered characters or other input from the input device 406 with stored information in the database 202. In still other embodiments, the access control reader 400 may be coupled to both the reader 404 and the input device 406.

In this arrangement, the live access control reader 400 both reads live biometric data and accesses stored biometric data to be used during an access control operation described in more detail below. Also, in some embodiments an additional level of security can be provided because multiple factors (a live biometric and an input) may be used in access control. This architecture provides significant installation advantages for incorporating aspects of the system 100 into existing stand-alone access control systems having Wiegand panels. For instance, one or more live access control readers 400 can be coupled to one or more existing Wiegand panels 402. This allows existing stand-alone Wiegand access control systems to be easily upgraded to a more secure, scalable, network-based access control system 100 of the present invention.

As also seen in FIG. 4, the extracting system 108 may be coupled to the archive and/or log system 116A. Also, the live access control reader 400 may be coupled to the archive and/or log system 116B.

Access Control Panel

Figure 5:
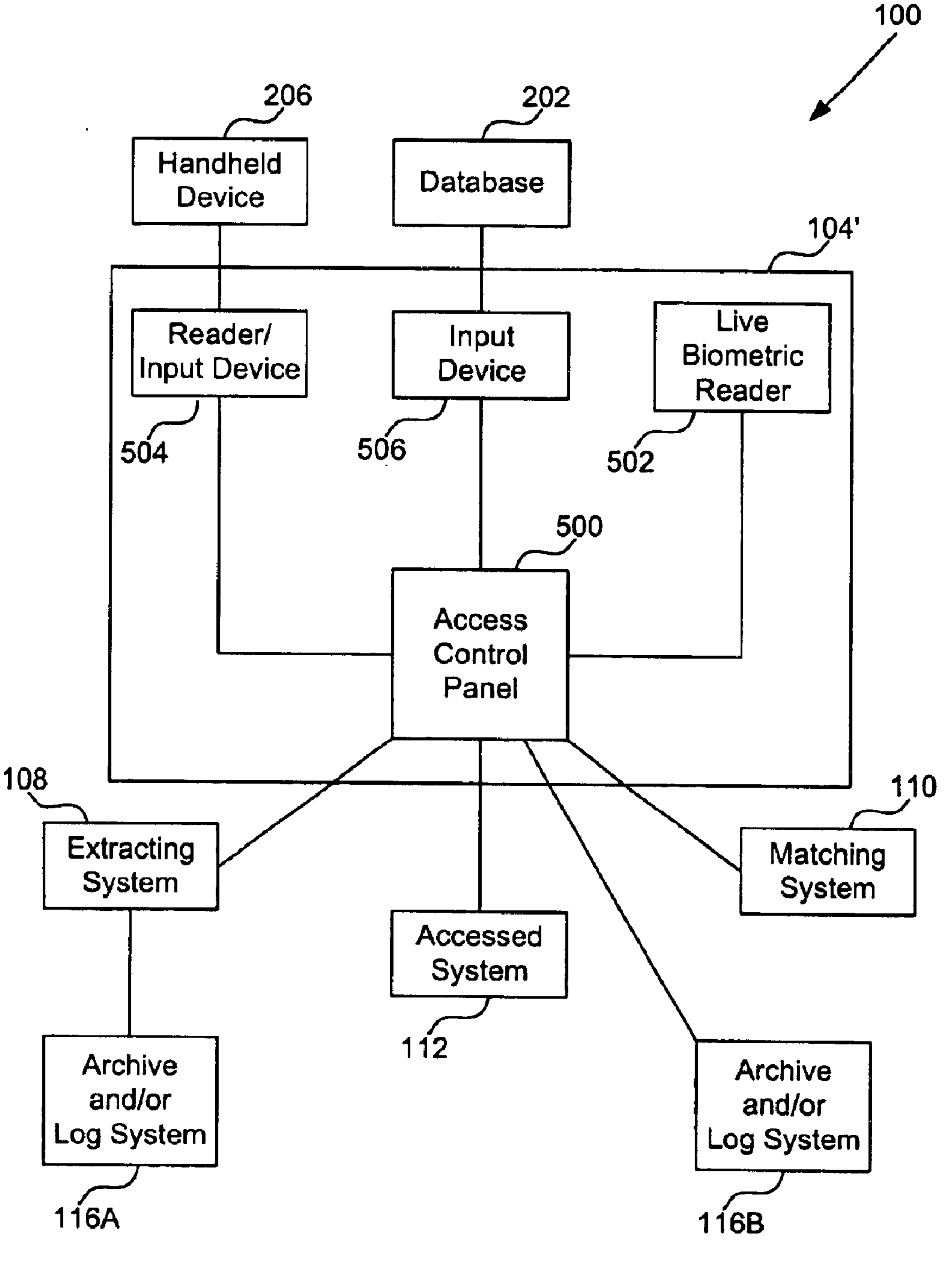
FIG. 5 shows example elements of the system of FIG. 1 with an access control panel in an access control system.

Turning now to FIG. 5, the access control apparatus 104' in the system 100 according to embodiments of the present invention is shown. The access control apparatus 104' includes an access control panel 500 coupled to a live biometric reader 502. In some embodiments, the access control panel 500 is coupled to a reader/input device 504 that reads the handheld device 206. In other embodiments, the access control panel 500 is coupled to an input device 506, which may be a key system that accesses information in the database 202 based on correlating entered characters or other input from the input device 506 with stored information in the database 202. In still other embodiments, the access control panel 500 may be coupled to both the reader 504 and the input device 506.

In this arrangement, the access control panel 500 reads live biometric data and accesses stored biometric data to be used during an access control operation described in more detail below. As described with respect to FIG. 4, in some embodiments the use of multiple factors (live biometric data and stored or input data) provides an additional level of security. As also seen in FIG. 5, the extracting system 108 may be coupled to the archive and/or log system 116A. Also, the access control panel 500 may be coupled to the archive and/or log system 116B.

Network Extraction or Matching Systems

As shown in FIG. 1, according to a further feature of the present invention, extraction processing can be carried out by a remote extracting system 108 (FIG. 6). In this way, processing work is distributed across the system 100. Hence, the access control system 104, the access control reader 400, and the access control panel 500 need not carry out extraction. This reduces the processing requirement at the access control reader 400 or panel 500. Further, because extraction is handled at a remote site accessed over the network 114, the system 100 can more easily scale to accommodate more access control readers 400 and/or panels 500 and more enrollees. Different types of extraction, changes in extraction algorithms, or moving processing power to support extraction need only be provided in the extracting system 108 rather than the individual access control readers 400 or the individual access control panels 500.

Similar advantages are provided in a feature where matching processing is carried out by a remote matching system 110 (FIG. 7). In this way, processing work is distributed across the system 100. Hence, the access control system 104, access control reader 400, and access control panel 500 need not carry out matching. This reduces the processing requirement at the access control reader 400 or panel 500. Further, because matching is handled at a remote site accessed over the network 114, the system 100 can more easily scale to accommodate more access control readers 400 and/or panels 500 and more enrollees. Different types of matching, changes in matching algorithms, or moving processing power to support matching need only be provided in the matching system 110 rather than individual access control readers 400 or individual access control panels 500.

As seen in FIGS. 6 and 7, in some embodiments only the extracting system 108 (FIG. 6) or the matching system 110 (FIG. 7) may be directly coupled to the rest of the elements 104, 108/110, and 112 of the system 100. Thus, either one or both of the extracting system 108 or the matching system 110 would be coupled to the rest of the elements 104, 108/110, and 112 via the network 114. The network 114 may be an Intranet, and Internet, or any other type of network or combination of networks known in the art.

Example Access Control and Remote Verification System

Figure 8:
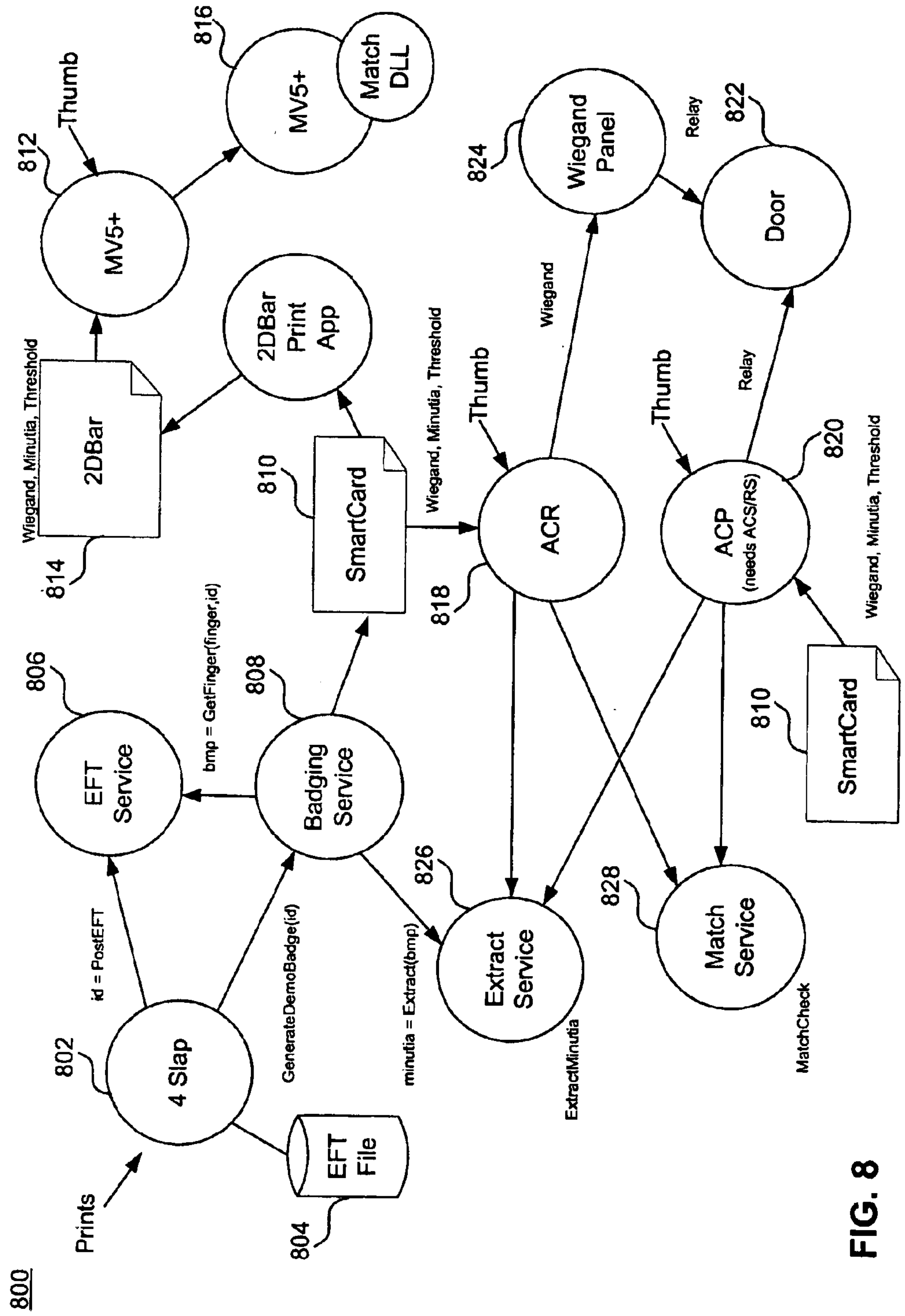
FIG. 8 shows an example system according to embodiments of the invention.

Shown in FIG. 8 is an example system 800 that includes features from various embodiments of the present invention, which may be described above or below. In this example, an enrolling system includes a biometric reader 802, which can be any live biometric scanner manufactured by Cross Match Technologies, Inc., or any other manufacturer. The biometric reader 802 is coupled between the EFT file 804, which converts read fingerprint data into useable data to be submitted to the EFT Service 806. The EFT Service 806 provides any information it may have on the individual being enrolled. The information is provided to the Badging Service 808 in order to store the information on a SmartCard 810. The stored data may be a Wiegand value, a threshold value, and a minutia value.

In this example, one embodiment of reading the SmartCard 801 may be to use a remote verification system including a mobile reader 812 that reads both a code 814 on the SmartCard 810 and a live fingerprint of an individual to perform matching in the verification system 816. The reader 812 may be manufactured by Cross Match Technologies, Inc. and the verification system may be a computer either linked or unlinked to a network, such as one found in a law enforcement vehicle.

Other embodiments used to read and utilize information on the SmartCard 810 are an access control reader (ACR) 818 environment and an access control panel (ACP) 820 environment. Either of these access control systems can be used to control access to a door 822, either via a Wiegand panel 824 or directly. As shown, both the ACR 818 and the ACP 820 can access the SmartCard 810 to send extracting parameters to an extracting service 826. Also, both the ACR 818 and ACP 820 can access the SmartCard to send stored biometric data and matching parameters, along with the live read biometric data read by a live biometric reader (not shown), to a matching service 828. In some embodiments, based on a result from the matching service 828, the ACR 818 sends Wiegand signal to the Wiegand panel 824 to control opening of the door 822 via a relay signal from the Wiegand panel 824. In other embodiments, based on a result from the matching service 828, the ACP 820 sends a relay signal to the door 822 to control its opening.

Threshold Value System

Figure 9A:
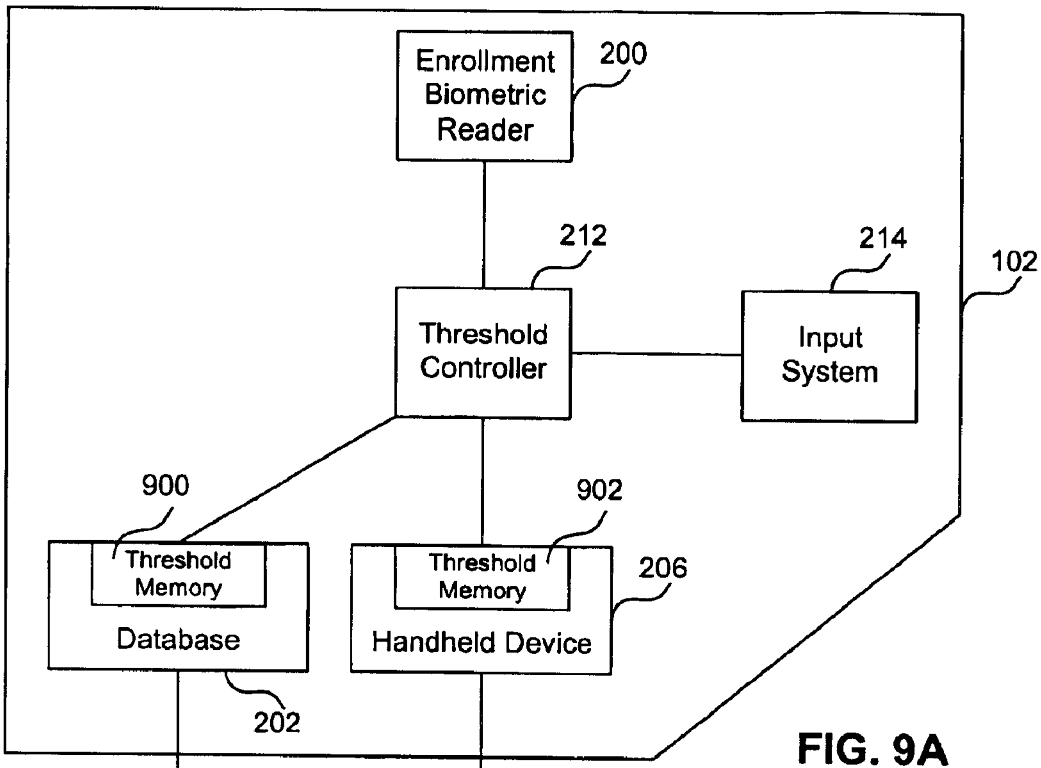
FIG. 9A shows example elements of the system of FIG. 1 with a threshold logic system in an enrolling system.
Figure 9B:
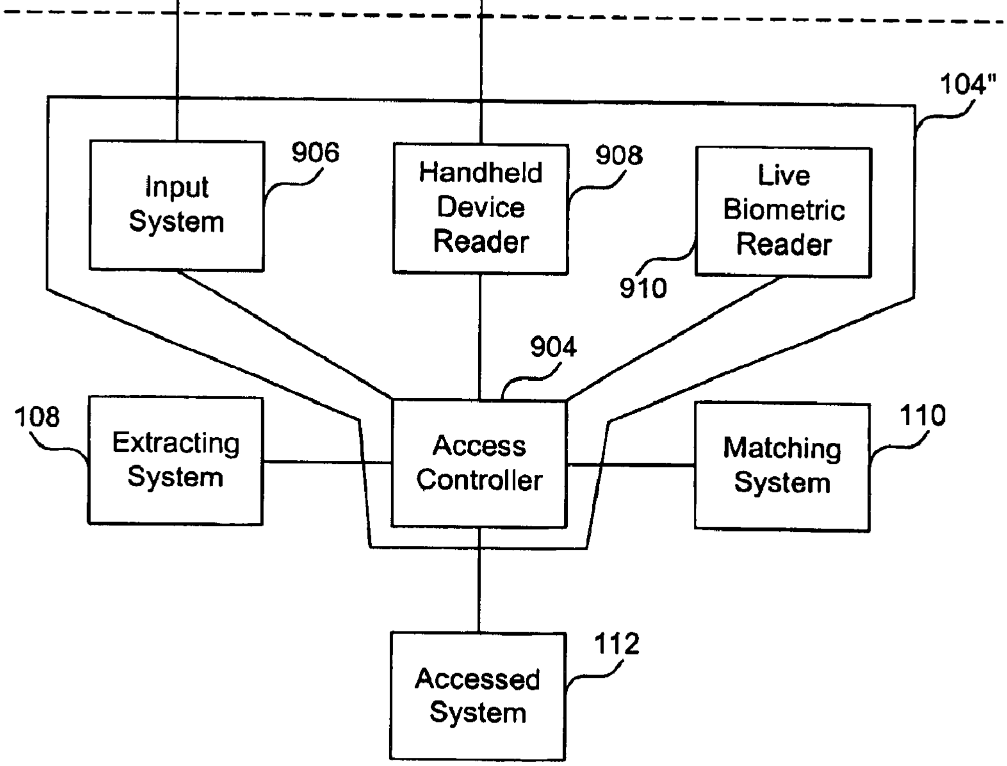
FIG. 9B shows example elements of the system of FIG. 1 that read the threshold logic value stored in a memory in the system of FIG. 9A.

Referencing FIGS. 9A and 9B, a portion of the system 100 that determines, generates, stores, and accesses a threshold value utilized in several embodiments of the present invention is shown. A detailed operation will be explained below with reference to FIGS. 17A, 17B, and 18. In the embodiment shown in FIGS. 9A–9B, the threshold controller 212 determines a threshold value based on criteria received or accessed from the input system 214 and the biometric data read by the enrollment biometric reader 200. Basically, the threshold value indicates required levels or tolerances for matching and extracting based on the quality of the read biometric data. The threshold controller 212 then generates a threshold value that is stored in a threshold memory 900 in the database 202, a threshold memory 902 in the handheld device 206, or both. Then, when an individual wants to access an accessed system 112, an access controller 904 accesses the threshold value in the database 202 via input system 906 or accesses the threshold value in the handheld device 206 via the handheld device reader 908. Either preceding or subsequent to this, the access controller 904 initiates reading of live biometric data of the individual via the live biometric reader 910. The threshold value is then used by the access controller 904 to further control extracting by the extracting system 108, matching by the matching system 110, or both.

As discussed above, one example of biometric data that may need the threshold value is a value indicative of a fingerprint image capture quality of an individual. For example, a low value can indicate a relative poor image capture quality, while a high value can indicate a relative high capture quality. Low threshold values may be appropriate for individuals with difficult to read fingerprints, such as those with dry fingers, missing or damaged fingers, or birth defects. High threshold values may be appropriate for individuals with easy to read fingerprints, such as those with oily fingers or with complete fingertips having a number of distinct minutiae. In embodiments of the invention, threshold values can be numeric values or categorical values (such as good, average, poor). These threshold values can be used in a variety of ways in the system 100 to accommodate an even greater range of biometric objects successfully managed by the system 100. A threshold value may be a required value or parameter generated from input criteria based on biometric data read and extracted by an extracting system 108 during an enrolling process. The threshold value is used during extracting, matching, or both, to most accurately determine the identity and characteristics of an individual wanting access to an accessed system 112 or being questioned by law enforcement in the field.

Overall Operation

Figure 10:
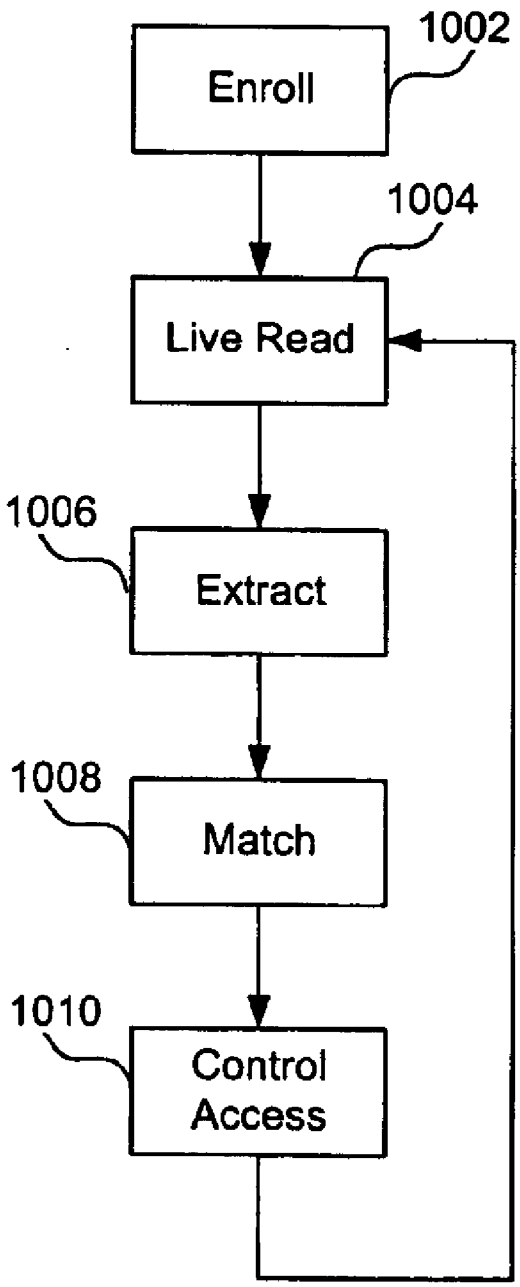
FIG. 10 shows example method steps to perform a biometric-based operation according to embodiments of the present invention.

An overall operation 1000 of the system 100 is shown in FIG. 10. In step 1002 an individual enrolls in the enrolling system 102 by having their biometric and other data read, extracted, accessed, and stored. A live read of biometric data is taken of an individual in step 1004 when they wish to access an accessed system 112. The live read biometric data is extracted by the extracting system 108 at step 1008. A matching operation is performed by the matching system 110 at step 1008 to compare at least the stored biometric data and the live read biometric data. Based on an output from the matching system 110 generated at step 1008, access to an accessed system 112 is controlled by the access control system 104 at step 1010.

Enrolling Operation

Figure 11:
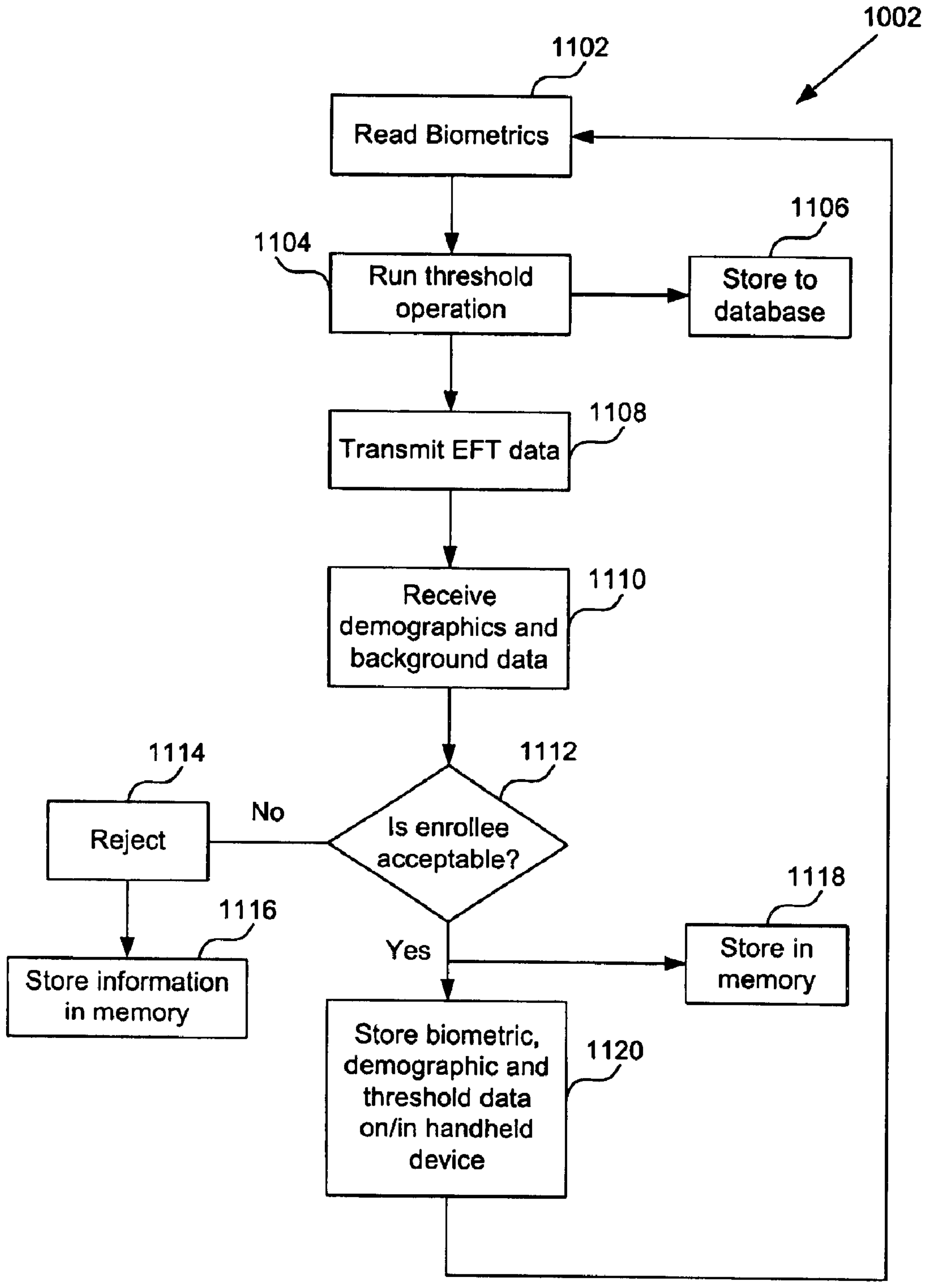
FIG. 11 shows example method steps to perform the enroll operation in FIG. 10.

The details of the enrolling operation 1002 performed by the enrolling system 108 according to embodiments of the present invention are shown in FIG. 11. The biometric reader 200 at step 1102 reads an individual's biometric data. In some embodiments, a threshold operation is performed at step 1104 by a threshold controller 212 and a threshold value is stored at step 1106. In other embodiments, the enrolling operation 1002 moves from step 1102 to step 1108, during which EFT data generated by the EFT file 208, which is based on the read biometric data, is transmitted to an EFT service 210. Information is received from the EFT service 210 at step 1110. Based on this information, a determination is made whether an enrollee is acceptable at step 1112. If no, the enrollee is rejected at step 1114, and their information is stored in a memory in the database 202 at step 1116. If yes, their biometric and other information is stored in a memory of a database 202 at step 1118, in a memory of a handheld device 206 at step 1120, or both. Following this, the enrolling operation 1002 returns to step 1102 and waits for more enrollees.

Remote Verification Operation

Figure 12:
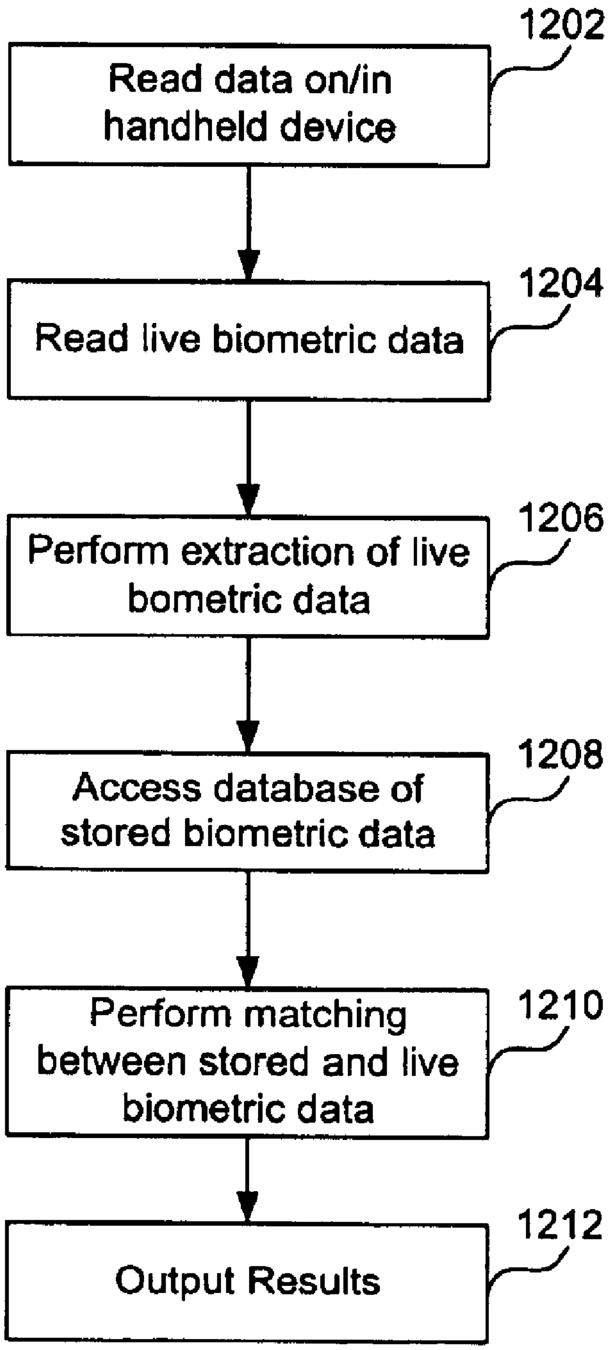
FIG. 12 shows example method steps to perform a remote verification operation according to embodiments of the present invention.

A mobile verification operation 1200 performed by the mobile verification system 106 is shown in FIG. 12. A law enforcement official in the field would perform this operation most likely during questioning of individuals for a routine traffic stop or during a crime investigation. The remote reader 300 reads data in or on the handheld device 206 during step 1202. As described above, the handheld device 206 may contain machine-readable code or bar code information that is read by the reader 300. Live biometric data is read by the reader 300 at step 1204, which is extracted at step 1206. The reader 300 is then coupled to a database at step 1208, which may be through use of either a wireless or wired system. For example, the reader 300 may have a USB jack and a law enforcement computer (not shown) may have a USB port. By coupling the reader 300 to the database, the read handheld device data and the live biometric data can be compared or matched with database information at step 1210. Based on this comparison or matching, the law enforcement official in the field can receive timely output as to information on the individual at step 1212. Thus, through the use of the handheld device 206 storing data, a more accurate and timely assessment of the situation can be made in the field.

This roving or mobile verification operation 1200 can be used to supplement the security provided by the system 100.

Access Control Operation

Extracting, Matching, and Controlling Operations

Figure 13:
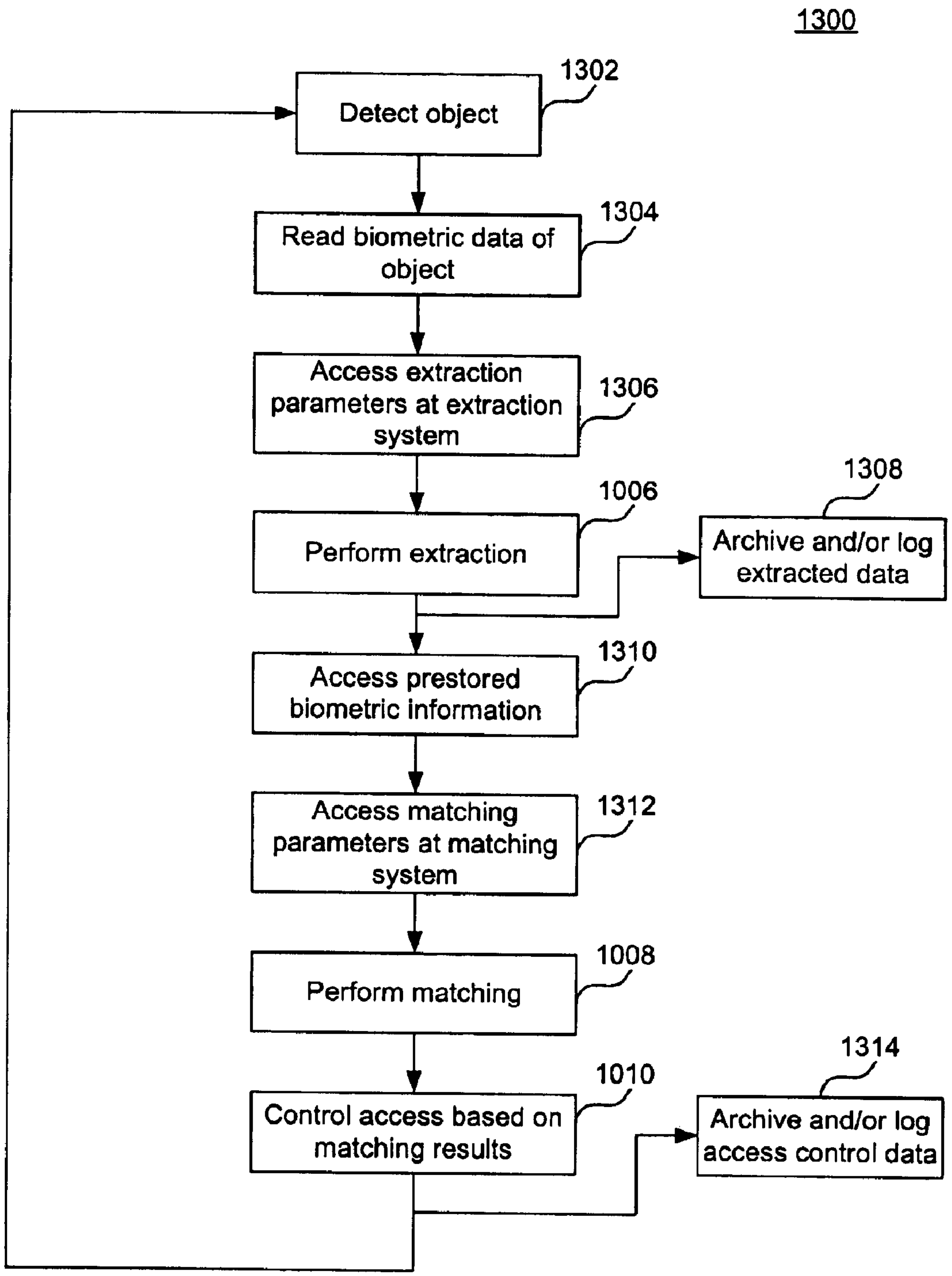
FIG. 13 shows example method steps to perform the access control operation in FIG. 10.
Figure 14:
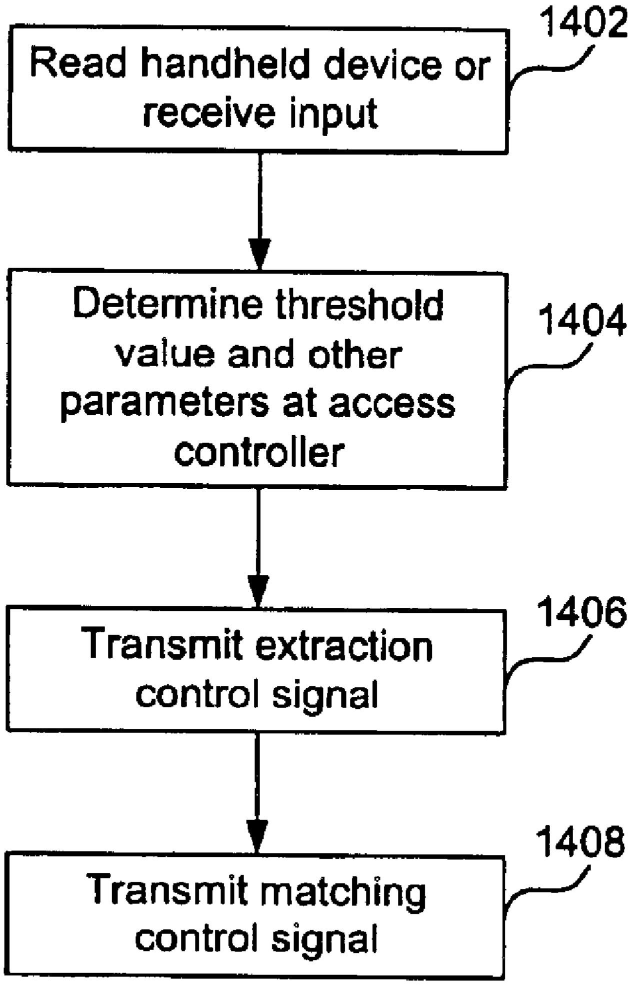
FIG. 14 shows example method steps to perform the access control operation of FIG. 10 when a threshold value is used.

Referencing FIGS. 13–14, several aspects of the overall access control operation 1000 are shown. In some embodiments that have stand-by modes to save power consumption, or other similar functions, an object is detected at an accessed system 112 at step 1302. In other embodiments where there is no special mode, step 1302 may be optional. The biometric data of the object is read at step 1304 by live access control reader 400, the live biometric reader 502, or the live biometric reader 910, or any other reader. The extracting system 108 accesses extraction parameters from the access control system 104 at step 1306. The extraction parameters may be related to a required image quality, contrast ratio, whether the image is white-on-black or black-on-white, whether the image can be or should be cropped, how many minutiae must be extracted, or the like. The extracting step 1006 is then performed. In some embodiments, extracted data is archived and/or logged in the archiving and logging system 116 at step 1308. In other embodiments, stored biometric data is accessed by the matching system 110 at step 1310 without performing step 1308. The matching system 110 accesses matching parameters at step 1312. Matching is performed at step 1008 by comparing the live read biometric data to the stored biometric data. Access is controlled at step 1010 based on results from the matching step 1008. In some embodiments, the matching results or other control data received at the access controller 104 are archived and/or logged in the archiving and logging system 116 at step 1314. In other embodiments, the operation 1300 returns to step 1302 to await detection of another object.

The extraction parameter step 1306 and the matching parameter step 1312 are performed along with an operation 1400 shown in FIG. 14. Some of the parameters are determined by reading the handheld device 206 or receiving information from the input device 406, 506, or 906 at step 1402. Depending on the embodiment, values for threshold and other parameters are determined by the access control system 104 at step 1404. After receiving the request for extraction parameters at step 1306, the extraction parameters are transmitted at step 1406. Also, after receiving the requests for matching parameters at step 1312, the matching parameters are transmitted at step 1408.

Access Control Reader Operation

Figure 15:
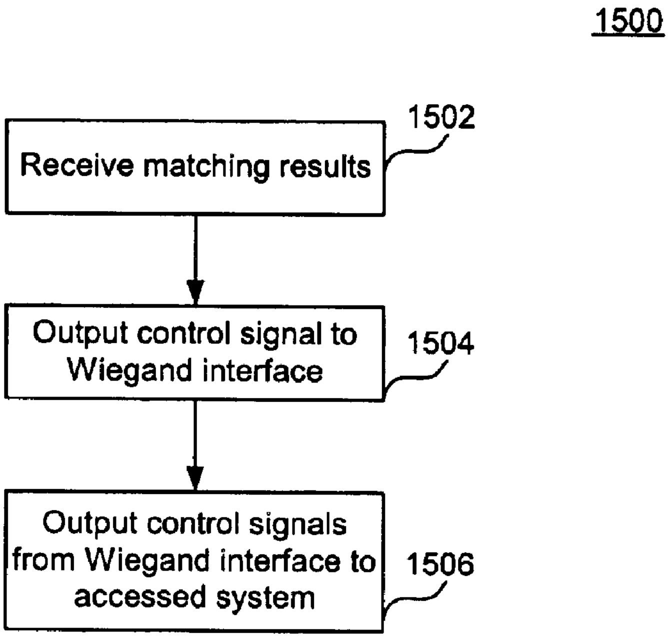
FIG. 15 shows example method steps to perform an access control operation of FIG. 10 using an access control reader.

After performing the operations shown in FIGS. 13–14, the access control system 104 of FIG. 4 performs an access control operation 1500, which is shown in FIG. 15. The live access control reader 400 receives matching results from the matching system 110 at step 1502. Based on the results, the live access control reader 400 outputs a control signal to a Wiegand panel 402 at step 1504. In turn, the Wiegand panel 402 sends a relay or control signal to the accessed system 112 at step 1506.

Access Control Panel Operation

Figure 16:
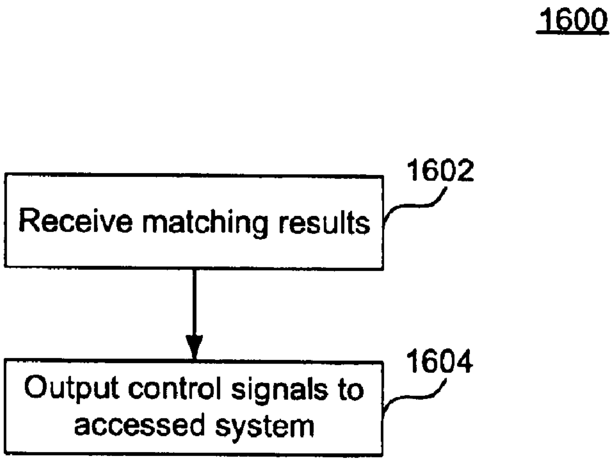
FIG. 16 shows example method steps to perform an access control operation of FIG. 10 using an access control panel.

Similar to the operation shown in FIG. 15, after performing the operations shown in FIGS. 13–14, the access control system 104' of FIG. 5 performs an access control operation 1600, which is shown in FIG. 16. Due to the fact the system in FIG. 5 has a central access control panel 500, and not just an access control reader 400, more direct control of the accessed system 112 can be achieved. Thus, matching results from the matching system 110 are received at the access control panel 500 at step 1602. Based on the results, the access control panel 500 sends a control or relay signal directly to the accessed signal 112 at step 1604.

Threshold Value Operation

Figure 17A:
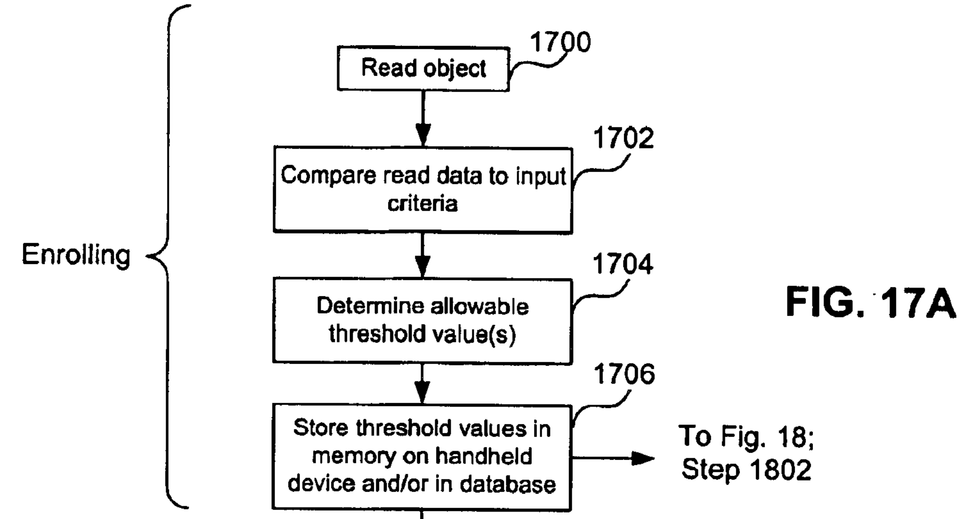
FIG. 17A shows example method steps to perform a threshold value generation operation during the enrolling operation of FIG. 10.
Figure 17B:
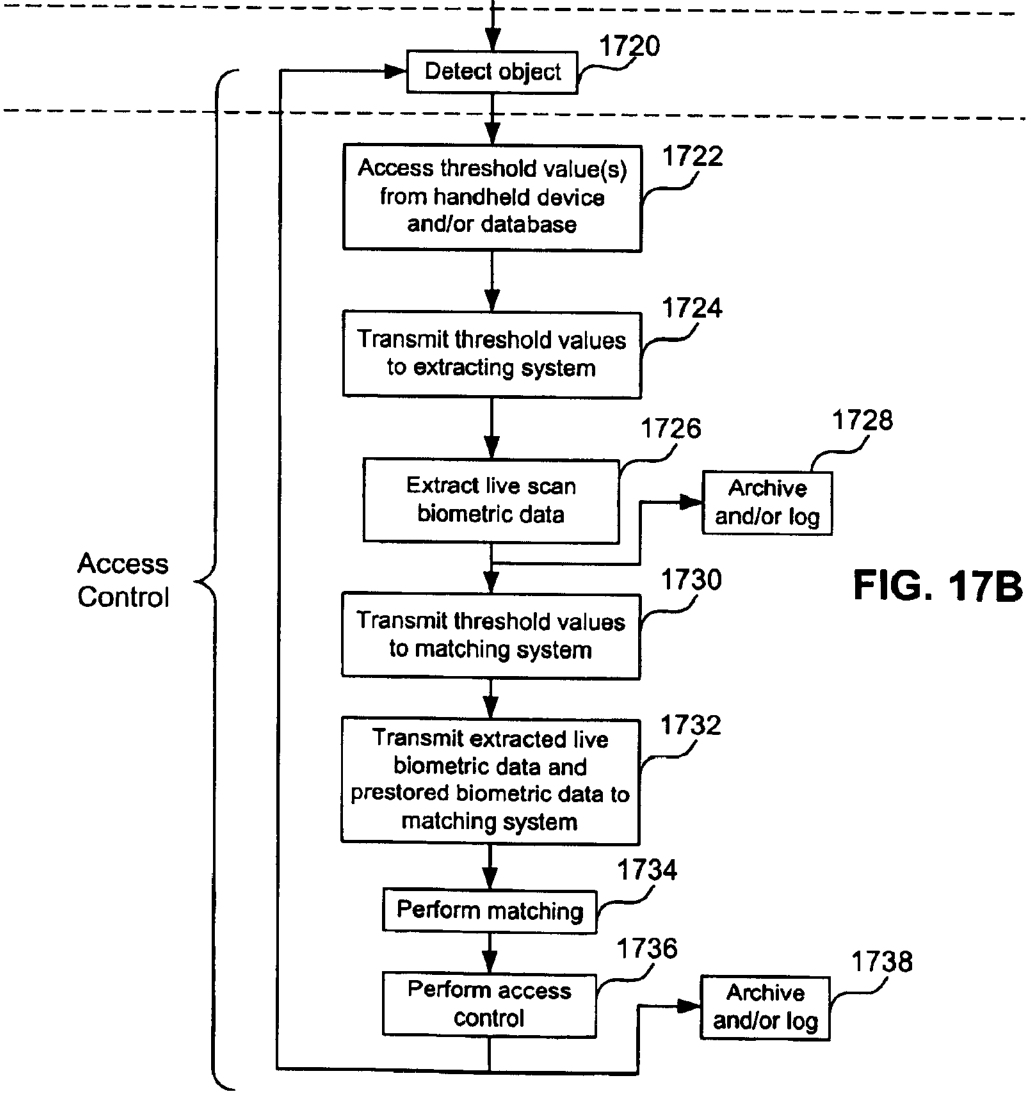
FIG. 17B shows example method steps to use a threshold value generated during the enrolling operation as shown in FIG. 17A during an access control step in FIG. 10.
Figure 18:
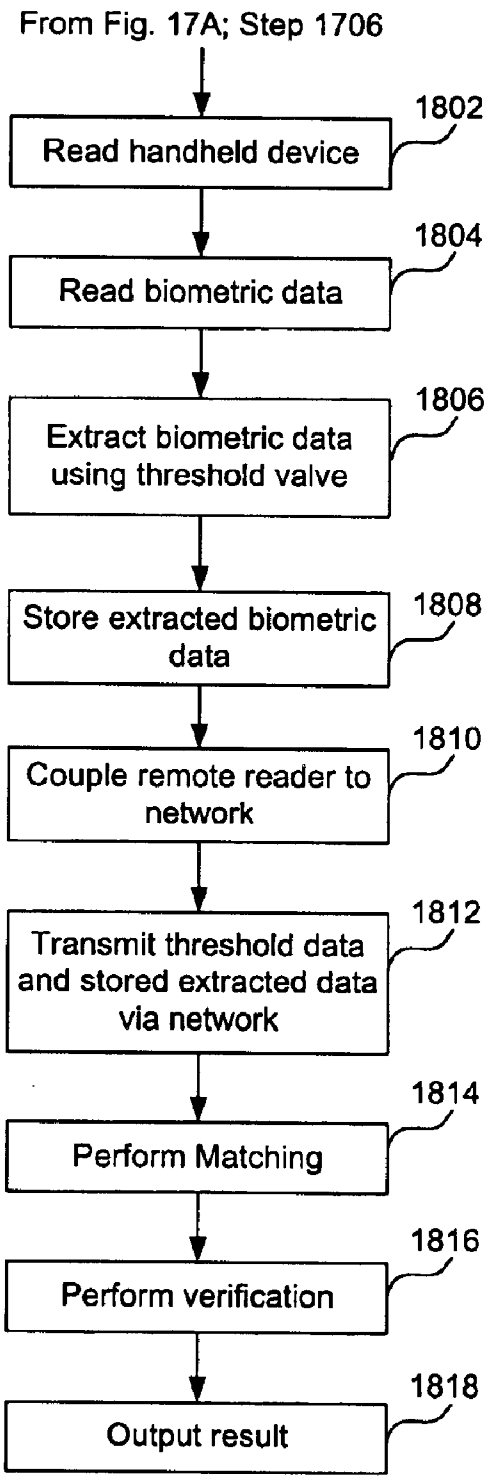
FIG. 18 shows example method steps to use a threshold value generated during the enrolling operation as shown in FIG. 17A during a remote verification operation according to embodiments of the present invention.

A threshold value determination and generation operation 1104, and how the generated threshold value is utilized, are shown in more detail in FIGS. 17A, 17B, and 18. The biometric reader 200 at step 1700 reads biometric data of an object. The read biometric data is processed by the threshold controller 212 by comparing the quality or other aspects of the data with criteria input via the input system 214 at step 1702. Based on this comparison, a threshold value(s) is determined for each type of biometric data at step 1704. For example, as discussed above, a low quality print would result in one threshold value, while a high quality print would result in another threshold value. The threshold value is stored either in the memory 900 of the database 202, the memory 902 of the handheld device 206, or both at step 1706. If the access control operation 1300–1400 is performed with the threshold value, the use of the threshold value is shown in FIG. 17B. Otherwise, if the mobile verification operation 1200 is performed with the threshold value, the use of the threshold value is shown in operation 1800 in FIG. 18.

As seen in FIG. 17B, an object is detected at step 1720. The threshold value is accessed by an access controller 400, 500, or 904 at step 1722 from either memory 900 or memory 902. The threshold value is transmitted to the extracting system 108 at step 1724. The threshold value is used during an extraction of live biometric information at step 1726. In some embodiments, the extracted biometric information is archived and/or logged by the archiving and logging system 116 at step 1728. In other embodiments, the method moves from step 1726 directly to step 1730 and transmits the threshold value to the matching system 110. The live extracted and stored biometric data are transmitted to the matching system at step 1732. A matching result is determined in the matching system based on a comparison between the live biometric data and the stored biometric data at step 1734. A score is generated based on a comparison between the matching result and the threshold value, and the score is used at step 1736 to perform access control by the access controller 400, 500, or 904. In some embodiments, information used for access control is archived and/or logged by the archiving and logging system 116 at step 1738. In other embodiments, the method moves directly from step 1736 back to step 1720 and waits until another object is detected.

As seen in FIG. 18, a remote verification operation using threshold data 1800 starts by reading the handheld device 206 with the reader 300 at step 1802. The reading may include one or all of reading a machine-readable code or a bar code, which may be one or two-dimensional bar code, reading of a magnetic strip, and reading of a memory 902 to access the threshold value, stored biometric data, and other data. The reader 300 at step 1804 reads live biometric data. The threshold value accessed from the handheld device 206 during step 1802 is used by the extraction system in reader 300 to extract live biometric data at step 1806 from the read biometric data. The extracted live biometric data is stored in the reader 300 at step 1808. The reader 300 is coupled to a network at step 1810, which may be via a law enforcement field computer (not shown) or the like. The threshold value, the live biometric data, and the stored biometric data are transmitted via the network to a matching system at step 1812. Matching is performed at step 1814, which produces (1) a result of a comparison between the stored biometric data and the live biometric data and (2) a score is based on the result and the threshold value. The score is used to verify who the individual is at step 1816. An output is sent to the law enforcement field computer at step 1818 from the network. Thus, timely and accurate verification can be made in the field through use of the threshold value during scoring of the result.

The score values are a correlation between the live extracted biometric data and the stored biometric data based on the threshold value. For example, scores may range from 0 to 1000, where 500 is an acceptable score for an average individual as being a positive match, and anything below is not a positive match. The threshold value may adjust the acceptable score for a below average person to 300 in order for a match to be positive, while the threshold value may adjust the acceptable score for an above average person to 900 in order for a match to be positive. Thus, in this way each individual's biometric data is taken into consideration when determining what score is needed to allow then entry into an accessed system.

Remote Management Operation

Figure 19:
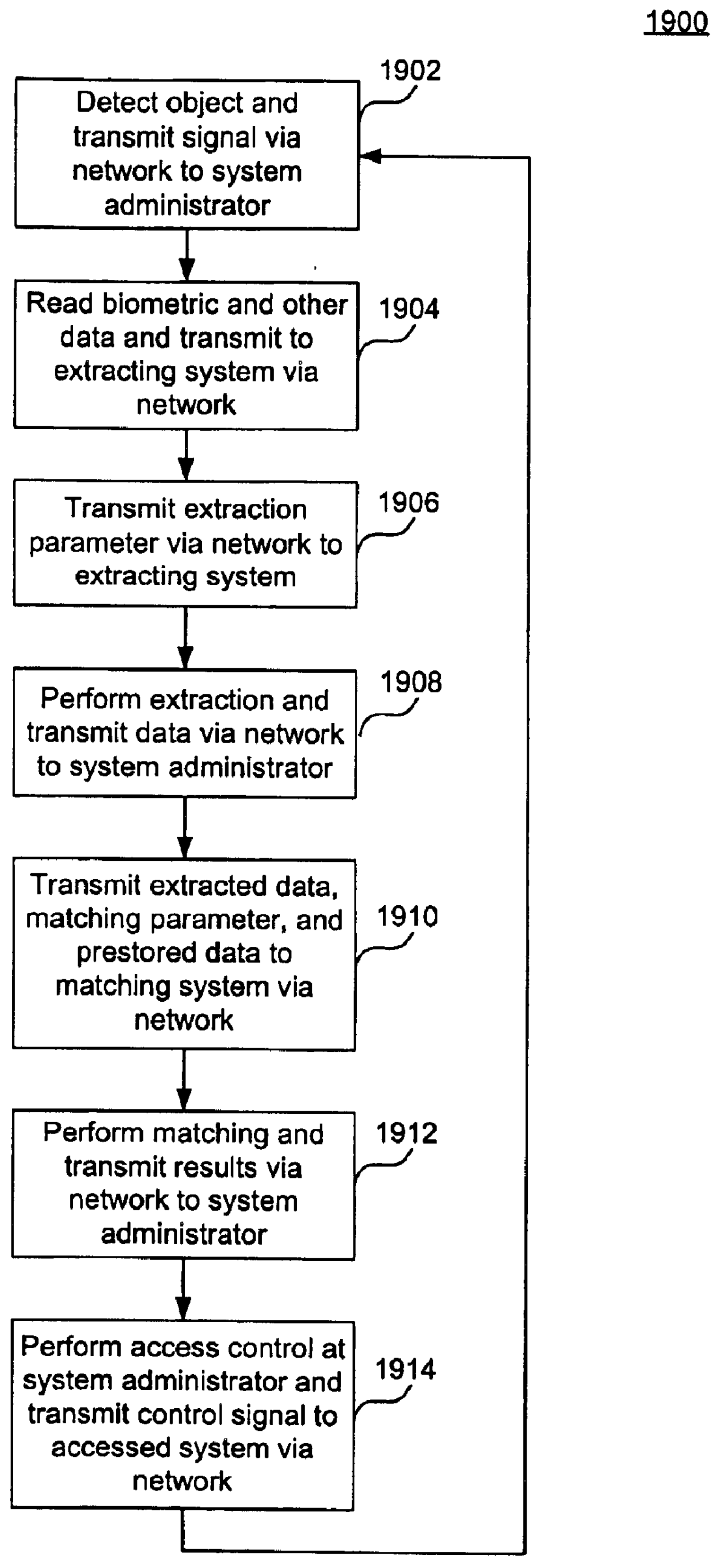
FIG. 19 shows example method steps to remotely manage access control using a system administrator according to embodiments of the present invention.

Turning now to FIG. 19, a remote management operation 1900 according to embodiments of the present invention is shown. An object of an individual trying to access the accessed system 112 is detected and the system administrator 118 is notified at step 1902. Live biometric data, stored biometric data, and other data is read at step 1904 and sent via the network 114 to the extracting system 108. Any parameters to be used during extraction are sent from the system administrator 118 to the extracting system 108 at step 1906. Extraction of the live biometric data is performed, and the extracted live biometric data is sent to the system administrator 118 via the network 114 at step 1908. The extracted live biometric data, the read stored biometric data, and any matching parameters are transmitted from the system administrator 118 to the matching system 110 at step 1910. The results from performing the matching are transmitted to the system administrator 118 at step 1912 via the network 114. The system administrator 118 performs access control of the accessed system 112 based on the matching results at step 1914. After performing the access control, the method 1900 returns to step 1902 to wait for another object to be detected.

Figure 20:
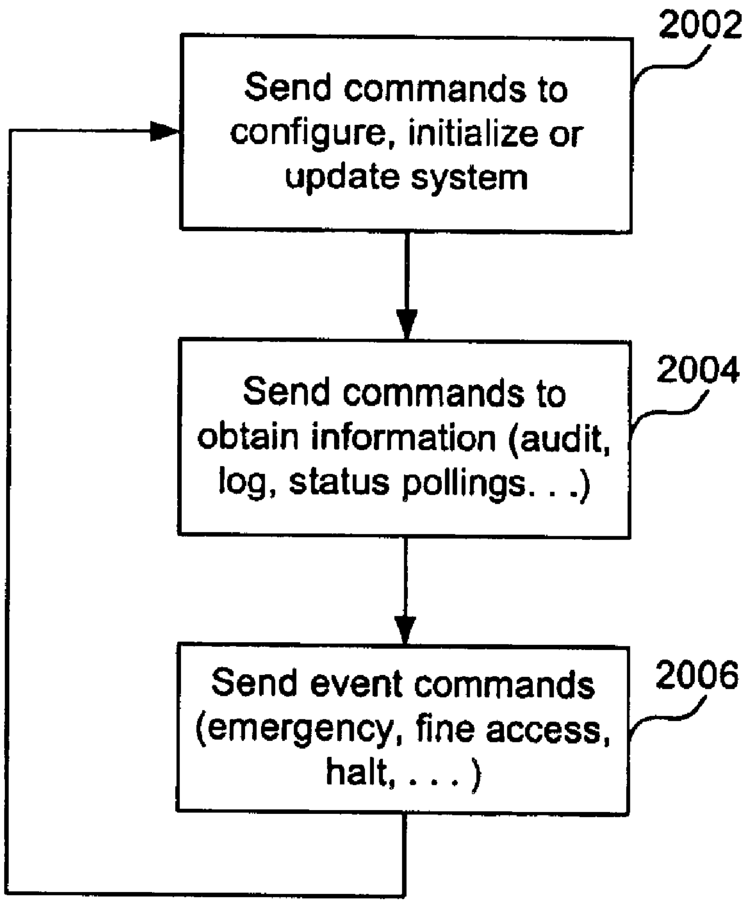
FIG. 20 shows example method steps to remotely manage access control using a system administrator according to embodiments of the present invention.

With reference to FIG. 20, a remote management operation 2000 according to other embodiments of the present invention is shown. The system administrator 118 sends commands to configure, initialize, or update the system 100 at step 2002. The system administrator 118 sends commands to obtain information from elements within the system 100 at step 2004. The information may be audit information, log information, status information, polling information, or the like. The system administrator 118 sends event commands at step 2006. This may be when there is an emergency, when fire access is required, when an individual is not allowed into an accessed system 112, or the like.

In these embodiments utilizing a system administrator 118, small organizations that need external support for their access control or large organizations that need a central or remote station for their access control can utilize a network, such as the Intranet or the Internet, as part of their access control system 100. For a small company, this helps reduce some costs involved in installing and maintaining an access control system. While in large companies this gives central station information about every single thing requiring access control in a company, such that problems can be detected and resolved timely.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:

(a) reading information from a smart card of an enrollee at an access control location;

(b) transmitting the information via a network to a central processing location;

(c) generating image data from a live capture of an image of a biometric of the enrollee using a live capture device at the access control location;

(d) transmitting the image data via the network to the central processing location;

(e) accessing the image data from the central processing location at an extraction location via the network to extract extraction information from the accessed image data;

(f) transmitting the extraction information via the network to the central processing location;

(g) accessing the information from the smart card from the central processing location and the extraction information from the central processing location at a matching location via the network to generate a matching result through comparing the extracted information with the information from the smart card;

(h) transmitting the matching result to the central processing location via the network; and (i) performing access control at the access control location via the network based on the matching result.

2. The method of claim 1, further comprising:

(j) using a system administrator at the central processing location to perform step (i).

3. The method of claim 2, wherein step (j) comprises:

using an access control device as the system administrator that compares the matching result to a threshold value.

4. The method of claim 2, further comprising:

using an operator as the system administrator that reviews the matching results against a threshold value.

5. The method of claim 2, wherein:

step (g) further comprises determining a threshold quality value of the enrollee from the information on the smart card; and step (i) further comprises using the threshold quality value and the matching result to perform the access control.

6. The method of claim 2, wherein step (j) further comprises:

using the system administrator to at least one of initialize, configure, or update at least one or more devices utilized to perform steps (a)–(i).

7. The method of claim 2, wherein step (j) further comprises:

using the system administrator to access at least one of audit information, log information, status information, or polling information from one or more devices utilized to perform steps (a)–(i).

8. The method of claim 2, wherein step (j) further comprises:

using the system administrator to transmit one or more event commands to one or more devices used to perform steps (a)–(i).

9. The method of claim 1, wherein before step (e) the central processing location monitors a plurality of extraction locations coupled the network and chooses one of the plurality of extraction locations at which to perform step (e).

10. The method of claim 1, wherein before step (g) the central processing location monitors a plurality of matching locations coupled to the network and chooses one of the plurality of matching locations at which to perform step (g).

11. The method of claim 1, wherein:

before step (e) the central processing location monitors a plurality of extraction locations coupled the network and chooses one of the plurality of extraction locations at which to perform step (e); and before step (g) the central processing location monitors a plurality of matching locations coupled to the network and chooses one of the plurality of matching locations at which to perform step (g).

12. A system, comprising:

a means for reading information from a smart card of an enrollee at an access control location;

a means for transmitting the information via a network to a central processing location;

a means for generating image data from a live capture of an image of a biometric of the enrollee using a live capture device at the access control location;

a means for transmitting the image data via the network to the central processing location;

a means for extracting that accesses the image data from the central processing location at an extraction location via the network to extract extraction information from the accessed image data;

a means for transmitting the extraction information via the network to the central processing location;

a means for matching that accesses the information from the smart card from the central processing location and the extraction information from the central processing location at a matching location via the network to generate a matching result through comparing the extracted information with the information from the smart card;

a means for transmitting the matching result to the central processing location via the network; and a means for performing access control at the access control location via the network based on the matching result.

13. The system of claim 12, further comprising:

means for performing system administration at the central processing location coupled to the means for performing access control.

14. The system of claim 13, wherein said means for performing system administration at least one of initializes, configures, or updates at least one or more of the means coupled to the network.

15. The system of claim 13, said means for performing system administration access at least one of audit information, log information, status information, or polling information from one or more of the means coupled to the network.

16. The system of claim 13, wherein said means for performing system administration transmits one or more event commands to one or more means coupled to the network.

17. The system of claim 12, further comprising:

a means for monitoring a plurality of extraction locations coupled the network that chooses one of the plurality of extraction locations as the means for extracting.

18. The system of claim 12, wherein:

said means for matching determines a threshold quality value of the enrollee from the information on the smart card; and said means for performing access control uses the threshold quality value and the matching result to perform the access control.

19. The system of claim 12, further comprising:

a means for monitoring a plurality of matching locations coupled the network that chooses one of the plurality of matching locations as the means for matching.

20. The system of claim 12, further comprising:

a means for monitoring a plurality of extraction locations coupled the network that chooses one of the plurality of extraction locations as the means for extracting; and a means for monitoring a plurality of matching locations coupled the network that chooses one of the plurality of matching locations as the means for matching.

21. A distributed system for access control, comprising:

a reader that reads information from a smart card of an enrollee at an access control location;

a transmitter that transmits the information via a network to a central processing location;

an image generator that generates image data from a live capture of an image of a biometric of the enrollee using a live capture device at the access control location;

a transmitter that transmits the image data via the network to the central processing location;

an extraction service that accesses the image data from the central processing location at an extraction location via the network to extract extraction information from the accessed image data;

a transmitter that transmits the extraction information via the network to the central processing location;

a matching service that accesses the information from the smart card from the central processing location and the extraction information from the central processing location at a matching location via the network to generate a matching result through comparing the extracted information with the information from the smart card;

a transmitter that transmits the matching result to the central processing location via the network; and an access controller at the access control location that controls access via the network based on the matching result.

* * * * *

UNITED STATES PATENT AND TRADEMARK OFFICE

CERTIFICATE OF CORRECTION

PATENT NO. : 7,079,007 B2
APPLICATION NO. : 10/125650
DATED : July 18, 2006
INVENTOR(S) : Siegel et al.

It is certified that error appears in the above-identified patent and that said Letters Patent is hereby corrected as shown below:

Cover Page
In item (54), the title should read --A Distributed System and Method for Access Control--.

In item (75), please delete the inventor “Frank E. Fernandez”.

Page 3
In item (56), under “Foreign Patent Documents”, please insert the following citations:
EP 0 623 890 B1 08/2001 Tetsuji, et al.

Signed and Sealed this

Twenty-third Day of September, 2008

Jon W. Dudas

JON W. DUDAS
*Director of the United States Patent and Trademark Office*

UNITED STATES PATENT AND TRADEMARK OFFICE

CERTIFICATE OF CORRECTION

PATENT NO. : 7,079,007 B2
APPLICATION NO. : 10/125650
DATED : July 18, 2006
INVENTOR(S) : Siegel et al.

It is certified that error appears in the above-identified patent and that said Letters Patent is hereby corrected as shown below:

Cover Page
In item (54), and Column 1, lines 1 and 2, the title should read --A Distributed System and Method for Access Control--.

In item (75), please delete the inventor "Frank E. Fernandez".

Page 3
In item (56), under "Foreign Patent Documents", please insert the following citations:
EP 0 623 890 B1 08/2001 Tetsuji, et al.

This certificate supersedes the Certificate of Correction issued September 23, 2008.

Signed and Sealed this

Fourteenth Day of October, 2008

JON W. DUDAS
*Director of the United States Patent and Trademark Office*